(12) United States Patent
Latham et al.

(10) Patent No.: US 12,143,656 B2
(45) Date of Patent: Nov. 12, 2024

(54) CONTROLLING SHARING OF CONTENT TARGETING DATA WITH CONTENT DELIVERY NETWORKS

(71) Applicant: Comcast Cable Communications, LLC, Philadelphia, PA (US)

(72) Inventors: Elizabeth Latham, Philadelphia, PA (US); Steven Pauken, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/886,115

(22) Filed: Aug. 11, 2022

(65) Prior Publication Data
US 2024/0056621 A1 Feb. 15, 2024

(51) Int. Cl.
*H04N 21/258* (2011.01)
*G06Q 30/0251* (2023.01)

(52) U.S. Cl.
CPC ... *H04N 21/25841* (2013.01); *G06Q 30/0261* (2013.01); *H04N 21/25833* (2013.01); *H04N 21/25883* (2013.01)

(58) Field of Classification Search
CPC ....... H04N 21/25841; H04N 21/25833; H04N 21/25883; G06Q 30/0261
See application file for complete search history.

(56) References Cited

U.S. PATENT DOCUMENTS

| | | | | |
|---|---|---|---|---|
| 2011/0218866 | A1* | 9/2011 | Wilson | G06Q 30/02 705/14.73 |
| 2012/0278830 | A1* | 11/2012 | Khoshgozaran | H04N 21/4788 725/25 |
| 2013/0246452 | A1* | 9/2013 | Vadrevu | G06F 16/9535 707/769 |
| 2015/0020083 | A1* | 1/2015 | Ben-Itzhak | G06F 9/543 719/320 |
| 2022/0188443 | A1* | 6/2022 | Shaw | G06F 21/602 |

OTHER PUBLICATIONS

Guidelines for Identifier for Advertising (IFA) on CTV/OTT platforms, Version 1.0, Released Dec. 2018, © 2018 AB Technology Laboratory https://labtechlab.com/OTT-IFA.

* cited by examiner

*Primary Examiner* — Yassin Alata
(74) *Attorney, Agent, or Firm* — Banner & Witcoff, Ltd.

(57) ABSTRACT

Systems, apparatuses, and methods are described for controlling sharing of content targeting data (e.g., user-specific data and/or device-specific data) with content-outputting software applications outputting both primary content and secondary content. A user may specify whether the user wants to receive targeted secondary content from the content outputting-software applications. The user may also specify whether the user wants to share content targeting data with the content-outputting software applications. Content targeting data may be shared based on whether the content targeting data is used for selecting targeted secondary content for the user.

23 Claims, 20 Drawing Sheets

User Interface 802 for Privacy Settings

Enable delivery of targeted secondary content items.

Application A ☐  Application B ☒  Application C ☐  All Applications ☐

FIG. 8A

User Interface 804 for Privacy Settings

Select content targeting data that can be used for targeted secondary content.

- ☐ User Identifier
- ☒ Device Identifier
- ☐ User Account Indentifier
- ☐ Internet Protocol Address
- ☐ Address
- ☐ Country
- ☒ ZIP Code
- ☐ Designated Marketing Area
- ☐ Primary Content Information
- ☒ Primary Content Genre
- ☐ User Rating for Primary Content
- ☐ Primary Content Viewing Data
- ☐ Demographic Data
- ☐ Psychographic Data

FIG. 8B

CONTROLLING SHARING OF CONTENT TARGETING DATA WITH CONTENT DELIVERY NETWORKS

BACKGROUND

User devices may host software applications that enable the user devices to access content from various content delivery networks. While requesting the content from the content delivery networks, the applications may send data specific to the user devices (e.g., an identifier of a user device, etc.) or users associated with the user devices (e.g., a location of a user, an identifier for a user account, etc.) to the content delivery networks. However, the content delivery networks may use the data specific to the user device and/or the users to send targeted content to the user devices via the applications.

SUMMARY

The following summary presents a simplified summary of certain features. The summary is not an extensive overview and is not intended to identify key or critical elements.

A user may view content from different content delivery networks via content outputting software applications (e.g., apps) installed on a user device of the user. The user may specify whether the user wants to receive targeted content (e.g., targeted advertisements) from the different content delivery networks (e.g., advertisement delivery networks). Additionally, or alternately, the user may specify whether the user wants to share content targeting data (e.g., user- and/or device-specific data) with the content delivery networks (e.g., advertisement delivery networks). Systems, apparatuses, and methods are described for managing sharing of content targeting data based on the preference of the user. A user may enter a preference not to receive targeted content (e.g., targeted advertisements). A content outputting software application (e.g., an app) in a computing device (e.g., a user device or other devices requesting content on behalf of the user device) may request content targeting data. The computing device may determine if the requested content targeting data will be used to request and/or deliver targeted content (e.g., if an app in a user device is requesting content targeting data for requesting targeted advertisements) or will be used for the operations of the content outputting software application (e.g., if an app in a user device is requesting content targeting data for determining local radio or television channels and/or for performing other operations of the app). If the requested content targeting data will be used for the operations of the content outputting software application, the content targeting data may be sent to the content outputting software application. If the requested content targeting data will be used for selecting advertisements, sending of the content targeting data may be prevented.

These and other features and advantages are described in greater detail below.

BRIEF DESCRIPTION OF THE DRAWINGS

Some features are shown by way of example, and not by limitation, in the accompanying drawings In the drawings, like numerals reference similar elements.

FIGS. 8A and 8B show example user interfaces for privacy settings of user devices.

DETAILED DESCRIPTION

Figure 1:
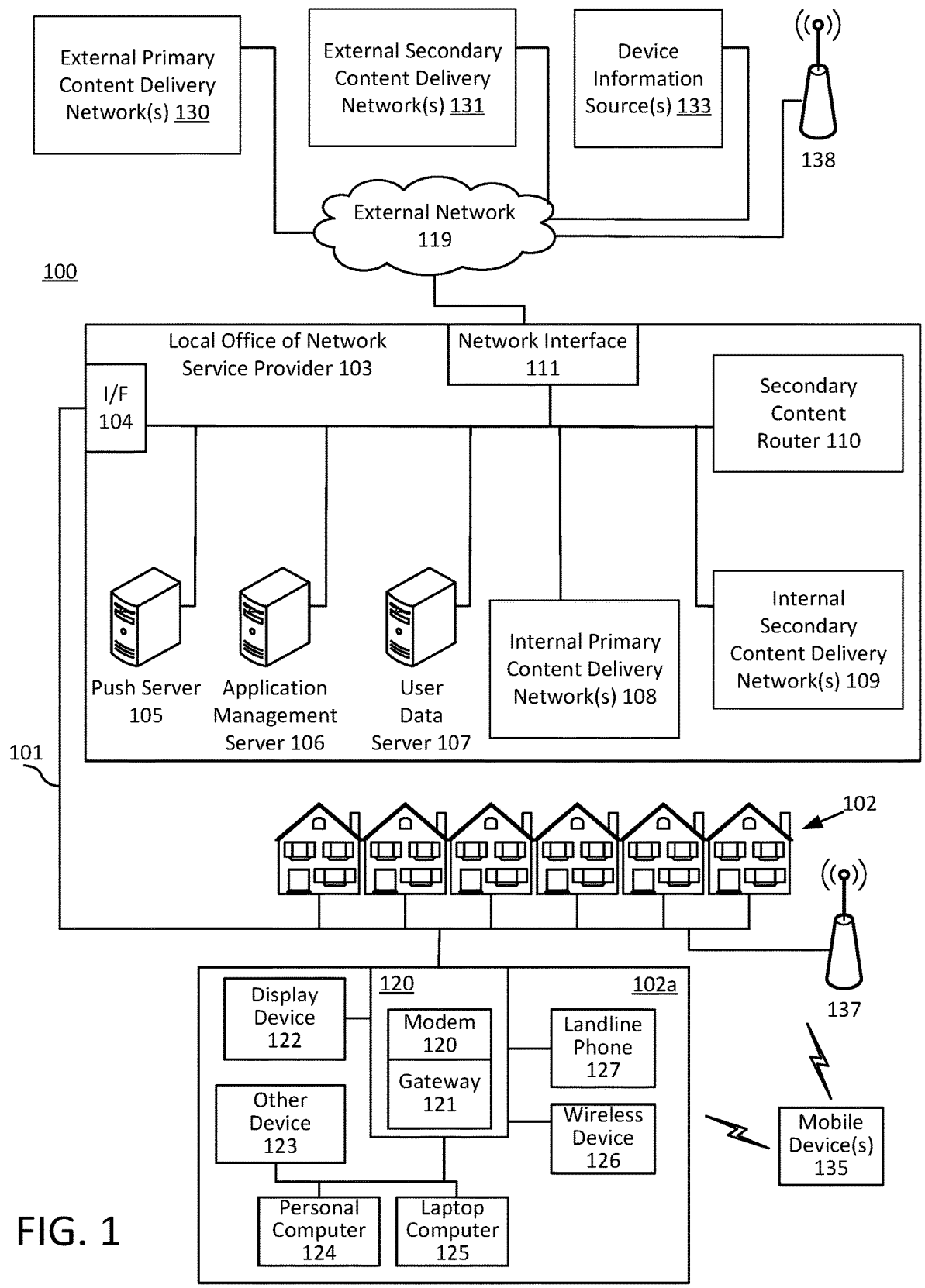
FIG. 1 shows an example communication network for providing primary and secondary content to user devices.

The accompanying drawings, which form a part hereof, show examples of the disclosure. It is to be understood that the examples shown in the drawings and/or discussed herein are non-exclusive and that there are other examples of how the disclosure may be practiced.

Primary content delivery networks (e.g., networks of broadcasters, platform operators, cable networks, network service providers, entities providing online streaming and/or download of content, channels, or media representative firms) may provide a variety of different types of primary content items (e.g., sporting events, documentaries, series, news programs, movies, etc.) to users and/or user devices belonging to the users. The primary content items may be accessible at different locations and/or via different user devices (e.g., via smart-TV, tablet, laptop, smartphone, etc.) and/or network computing devices (e.g., via gateways, set-top boxes, etc.). Secondary content delivery networks (e.g., advertisers, retailers, advertisement agencies, advertisement recommendation engines, government entities, etc.) may provide secondary content items (e.g., advertisements, promotions, infomercials, banners, hyperlinks, public service announcements, etc.) that can be shown to a user between the showings of different portions of a primary content item, between the showings of two primary content items, and/or in combination with a primary content item (e.g., as an overlay). The secondary content items may be directly or indirectly related to the primary content items or may be unrelated.

Primary content delivery networks may send a primary content item to a user device and may indicate to the user device one or more times and/or time periods within the display of the primary content item when one or more secondary content items can be inserted and also displayed by the user device. The user device may be responsible for requesting the secondary content items from secondary content delivery networks during available slots (e.g., slots corresponding to the indicated one or more times and/or time periods) in the delivery of a primary content item. A slot may be a period during the delivery of primary content items via which secondary content items may be delivered to users. For example, a stream for a soap opera or a movie may have several slots or opportunities (e.g., commercial breaks) to insert secondary content items. User devices streaming the same primary content item (e.g., a movie) may receive the same secondary content item during a slot (e.g., all viewers of a sporting event may watch an advertisement for one of the sponsors of the sporting event featuring one of the players), or may receive different secondary content items (e.g., half of the viewers of a sporting event may view an advertisement for car insurance while the other half may view an advertisement for a cat food product).

One type of secondary content items may be nontargeted secondary content items that may be designed and/or intended for delivery to any user despite the user's past viewership, demographic and/or psychographic characteristics (e.g., show an advertisement for a national car insurance company to all users watching a sporting event). A nontargeted secondary content item may be specific to users in a country (e.g., showing an advertisement for deals available only in the United States of America), county, neighborhood (e.g., showing an advertisement for a local coffee shop), or state (e.g., showing an advertisement for a retail store located only in Texas), and/or for a specific period (e.g., showing an advertisement for inflatable swimming pools from May to August).

Another type of secondary content item may comprise targeted content items (e.g., targeted advertisements) designed and/or intended for delivery to selected users and/or households that are likely to be most receptive to the messages embodied in the targeted secondary content items. Secondary content delivery networks may be requested to select users at geographic, demographic, and behavioral levels to deliver a targeted secondary content item. One way of targeting users may involve selecting targeted secondary content items for the users based on the users' demographic and/or psychographic characteristics (e.g., an advertisement for an expensive sports car may be wasted if delivered to users who are not able to afford or are otherwise uninterested in such cars). Additionally, the context of the primary content items may not be compatible with the particular types/themes of targeted content items (e.g., a movie having a non-violent theme may not mesh optimally with advertisements for UFC sporting or boxing events, regardless of demographics or geography). Users may receive targeted secondary content items via user devices (e.g., via smart-TV, tablet, laptop, gateway device, set-top box, or smartphone, etc.) configured to receive insertions of targeted secondary content items (e.g., in connection with receiving primary content items). A user and/or a household may be associated with a user device configured to receive insertions of targeted secondary content items for that particular user or household. For example, a household may comprise a first user, associated with a laptop and interested in cars, who may receive targeted content items about cars via the laptop, and a second user, associated with a smartphone and seeking to book a vacation, may receive targeted content items about vacations via the smartphone.

A user may prefer not to receive targeted secondary content items based on the user's location and/or user's past viewership, demographic and/or psychographic characteristics. Alternatively, or additionally, a user may prefer not to share content targeting data (e.g., personal information and/or device-specific information) with the secondary content delivery network. User devices and a secondary content router described herein may manage data flow to one or more secondary content networks based on the user's privacy preferences.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein. The communication network 100 provided by the network service provider may enable the devices (e.g., user devices, networking devices) in premises 102 to communicate with other devices in the premises 102 and/or communicate with the local office 103.

The communication links 101 may originate from the local office 103 and may comprise components not shown, such as splitters, filters, amplifiers, etc., to help convey signals clearly. The communication links 101 may be coupled to one or more wireless access points 137 configured to communicate with one or more mobile devices 135 via one or more wireless networks. The mobile devices 135 may comprise smartphones, tablets, or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as devices 105-109, 110, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS), or an integrated cable modem termination system (I-CMTS)), one or more digital subscriber line access modules (DSLAMs), and/or any other computing device(s).

The local office 103 may comprise one or more network interfaces 111 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 135 via the interface 111 and one or more of the external networks 109, e.g., via one or more of the wireless access points 138.

An internal primary content delivery network 108 (which may be part of the local office 103 or in communication with the local office 103) may be configured to provide primary content items to devices in the premises 102 and/or to the mobile devices 135. Primary content items stored in the primary content delivery network 108 may comprise movies, television programs, online video programming, Internet radio, any variety of audio files, etc. The primary content delivery network 108 may also store various video games that may be accessed by devices in the premises 102 via the communication link 101. The primary content items stored in the primary content delivery network 108 may include a single title or selection (e.g., a single song, a single video program, or a single video game title or portion thereof) or a collection of programs (e.g., an entire album, several episodes of a television program, different 'chapters' of a single video as it might otherwise appear on a DVD, or various levels of a video game). In addition, the internal primary content delivery network 108 may comprise software to validate user identities and entitlements, locate and retrieve requested primary content, and/or initiate delivery (e.g., streaming) of the primary content.

An internal secondary content delivery network 109 (which may be part of the local office 103 or in communication with the local office 103) may be configured to provide secondary content (e.g., advertisements, promotions, infomercials, banners, hyperlinks, public service announcements, etc.) to devices in the premises 102 and/or to the mobile devices 135. The secondary content items stored at the internal secondary content delivery network 109 may include downloadable content such as video data, audio data, still image data, binary program data, or any combination of the above that is not otherwise primary content. Examples of secondary content items include advertisements, which may be made up of video images, animations, sounds, applets, and any other variety of features (e.g., HTML links in an advertisement to a site for purchase of a particular advertised product).

Additionally, or alternatively, one or more external primary content delivery network(s) 130 and/or one or more external secondary content delivery networks 131 may be accessible via the external network 119. The external primary content delivery networks 130 and/or the external secondary content delivery networks 131 may be configured to communicate with the devices 105-109, 110 in the local office 103 and/or with computing devices located in or otherwise associated with one or more premises 102. The external primary content delivery networks 130 may be similar to the internal primary content delivery networks 108 and may provide primary content items to devices in the premises 102 and/or mobile devices 135. Similar to the internal secondary content delivery network 109, the external secondary content delivery network 131 may provide secondary content items to devices in the premises 102 and/or mobile devices 135.

Devices in the premises 102 and/or the mobile devices 135 may comprise software applications (also referred to as an "app") to request primary content items from the internal primary content delivery networks 108 and/or the external primary content delivery networks 130. The internal primary content delivery networks 108 and/or the external primary content delivery networks 130 may send the requested primary content items to the applications. Applications may cause display and/or output of the requested primary content items to users of the devices in the premises 102 and/or the mobile devices 135. An application may be configured to request primary content from a corresponding one of the primary content delivery networks 108 and/or a corresponding one of the external primary content delivery networks 130. The devices in the premises 102 and/or the mobile devices 135 may download the applications from an application management server 106 or one or more application distribution servers located outside the local office 103. The application management server 106 may be a server that provides various applications for downloading. Although the network service provider may maintain its own internal secondary content delivery networks 109, secondary content items may also be delivered from one or more external secondary content delivery networks 131. Some of the external secondary content delivery networks (e.g., advertisement networks) may be associated with applications installed or present in user devices.

Users of a device in the premises 102 and/or of the mobile devices 135 may create user accounts with the network service provider maintaining the local office 103. The account information for each created user account may be maintained in the user data server 107. The user data server 107 may store profile information for each user account, including a unique account identifier identifying the user account, personal information, username, password, email address, home address, credit card information, banking information, etc. The user data server 107 may also include account management information, such as data storage locations, security settings, personal configuration settings, etc. In addition, the user data server 107 may be responsible for monitoring user content viewing habits and collecting information from that monitoring for use in selecting primary and second content items.

A secondary content router 110, which may be part of the local office 103 or otherwise in communication with the local office 103, may be responsible for managing the delivery of secondary content items to devices in the premises 102 and/or to the mobile devices 135. For example, user devices in the premises 102 and/or the mobile devices 135 may request secondary content items from the secondary content router 110. The secondary content router 110 may be responsible for requesting the secondary content items from various secondary content delivery networks (e.g., the internal secondary content delivery networks 109 and/or the external secondary content delivery networks 131), receiving the secondary content items from the secondary content delivery networks, and forwarding the secondary content items to the user devices. The user devices in the premises 102 and/or the mobile devices 135 may receive the secondary content items and insert the secondary content items in a video or audio stream of a primary content item being displayed or outputted by the devices.

The secondary content router 110 may be configured to forward a portion of the revenue gained by outputting the secondary contents to the user devices in the premises 102 and/or to the mobile devices 135 to different recipients of the revenue. The recipients may be any manufacturer and/or retailer of the user devices in the premises 102 and/or the mobile devices 135, etc. The secondary content router 110 may also be connected to the device information sources 133 via the external network 119 to receive information about user devices in the premises 102 and/or the mobile devices 135 from the manufacturers or retailers of the devices.

The push notification server 105 may be configured to generate push notifications to deliver information to devices in the premises 102 and/or to the mobile devices 135. The local office 103 may comprise additional servers, such as the additional push, content delivery networks, application management servers, and/or other types of servers. Although shown separately, the push server 105, the application management server 106, the user data server 107, the internal primary content delivery network 108, the internal secondary content delivery network 109, the secondary content management network 110, and/or other server(s) may be combined. The devices 105-107, and/or devices associated with the internal networks 108, 109, 110A, and/or other devices, may be computing devices and may comprise memory storing data and also storing computer executable instructions that, when executed by one or more processors, cause the device(s) to perform steps described herein.

An example premises 102a may comprise an interface 120. The interface 120 may comprise circuitry used to communicate via the communication links 101. The interface 120 may comprise a modem 120, which may comprise transmitters and receivers used to communicate via the communication links 101 with the local office 103 of the network service provider. The modem 120 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1A, but a plurality of modems operating in parallel may be implemented within the interface 120. The interface 120 may comprise a gateway 121. The modem 120 may be connected to, or be a part of, the gateway 121. The gateway 121 may be a computing device that communicates with the modem(s) 120 to allow one or more other devices in the premises 102a to communicate with the local office 103 and/or with other devices beyond the local office 103 (e.g., via the local office 103 and the external network(s) 109). The gateway 121 may comprise a set-top box (STB), digital video recorder (DVR), a digital transport adapter (DTA), a computer server, and/or any other desired computing device.

The gateway 121 may also comprise one or more local network interfaces to communicate, via one or more local networks, with devices in the premises 102a. Such devices may comprise, e.g., display devices 122 (e.g., televisions), other devices 123 (e.g., a DVR or STB), personal computers 124, laptop computers 125, wireless devices 126 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 127 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 135, which may be on- or off-premises.

The mobile devices 135, one or more of the devices in the premises 102a, and/or other devices may download one or more applications from the application distribution server 106. The mobile devices 135, one or more of the devices in the premises 102a, and/or other devices may request primary content items from the internal primary content delivery network 109 and/or the external primary content delivery network 130. The mobile devices 135, one or more of the devices in the premises 102a, and/or other devices may receive, store, output, and/or otherwise use assets. An asset may comprise a video, a game, one or more images, software, audio, text, webpage(s), and/or other content (e.g., primary content items and/or secondary content items).

Figure 2:
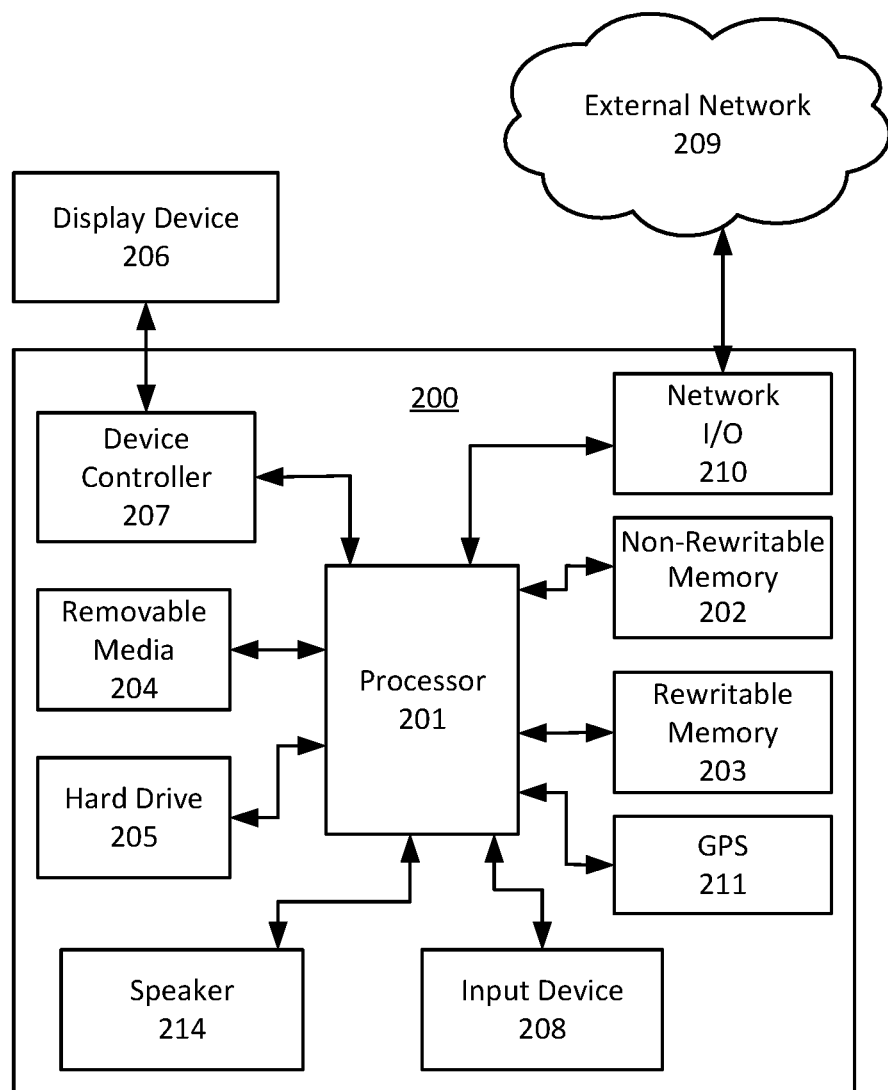
FIG. 2 shows hardware elements of a computing device.

FIG. 2 shows hardware elements of a computing device 200 that may be used to implement any of the computing devices shown in FIG. 1 (e.g., the mobile devices 135, any of the devices shown in the premises 102a, any of the devices shown in the local office 103, any of the wireless access points 127, any devices associated with and/or accessed via the external network 119) and any other computing devices discussed herein (e.g., an application management server, a secondary content router, primary content delivery networks, secondary content delivery networks, a user data server, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 119, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc., components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations, and other operations described herein. An IC may perform some operations based on the execution of programming instructions read from ROM or RAM, with other operations hardwired into gates or other logic. Further, an IC may be configured to output image data to a display buffer.

Figure 3:
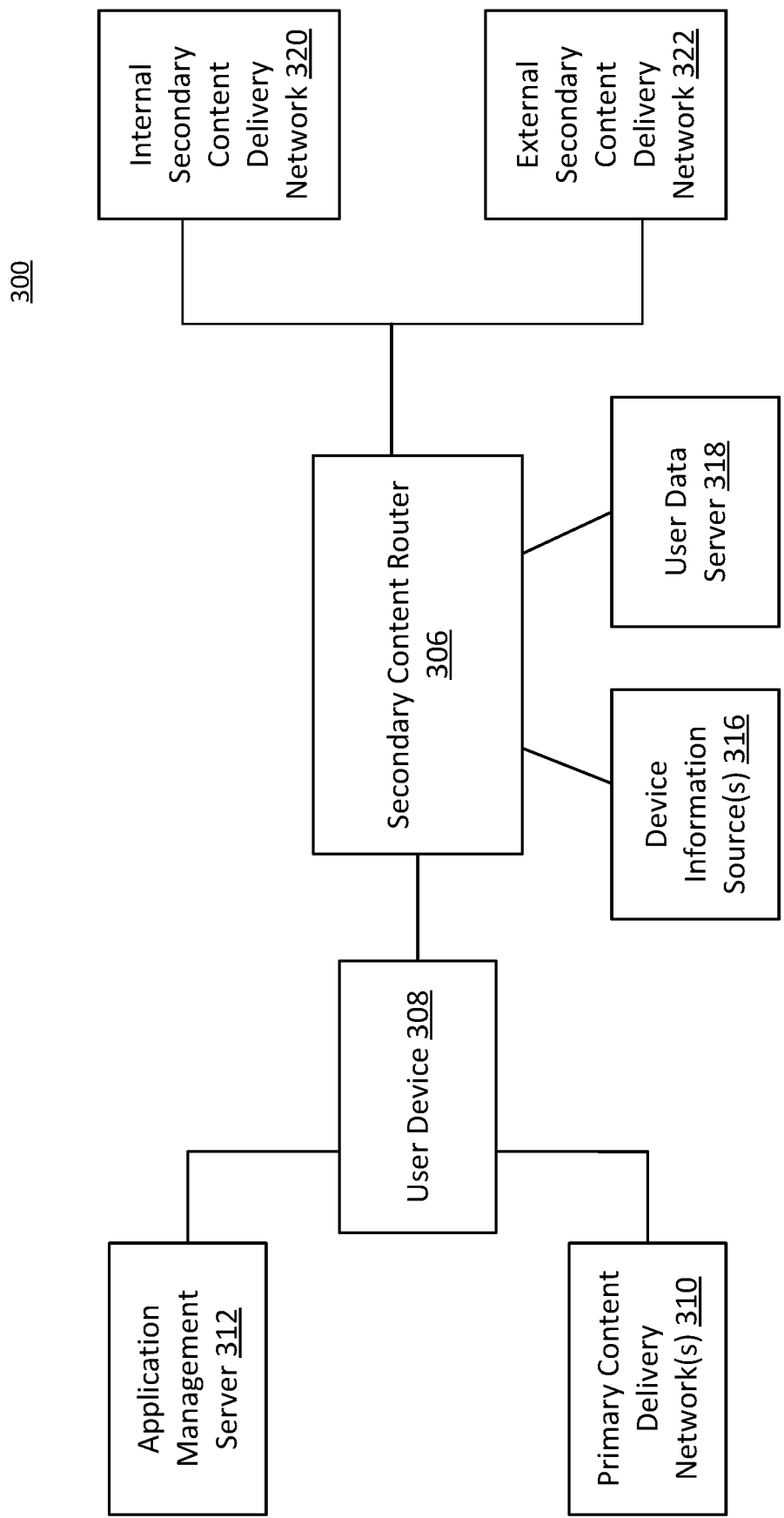
FIG. 3 shows an architectural level diagram of an environment that includes a user device and a secondary content router.

FIG. 3 shows an architectural level diagram of an environment 300 that includes a user device 308 and a secondary content router 306 (e.g., the secondary content router 110 in FIG. 1). The secondary content router 306 may comprise one or more computing device(s) and/or may be implemented on a cloud service, as a Software-as-a-Service (SaaS) application, or a web-architected application. The secondary content router 306 may be implemented in the context of any computer-implemented system, including a database system, a multi-tenant environment, or a relational database implementation. The secondary content router 306 may comprise one or more computing devices and/or one or more software components executing on one or more computing devices.

A user device 308 (e.g., any of the user devices in the premises 102, the mobile devices 135, the user devices 158, 160) may host one or more applications that the user device has installed from the application management server 312 (e.g., the application management server 106 in FIG. 1A or any other application distribution server external to the local office 103 in FIG. 1A). The user device 308 may connect to the application management server 312 and display one or more lists of applications available for download from the application management server 312 to users of the user device 308. A user may select one of the available applications, and the selected application may be downloaded and installed on the user device. The user device 308 may initiate or execute the application to connect to various primary content delivery networks 310 (e.g., the internal primary content delivery network 109, any one of the external primary content delivery network(s) 130). Initiating or executing an application may initiate streaming of a primary content item from one of the primary content delivery networks 310. Alternatively, the application may display one or more lists of primary content items available for display from the primary content delivery networks 310. Upon selection of a primary content item from the displayed lists, the application may send a request to the primary content delivery networks 310 to deliver the requested primary content item to the user device 308.

The application management server 312 may generate tokens for the user device 308, and the tokens may be used by the user device 308 to request secondary content items. The tokens may be used to identify the user device 308 while the user device 308 is requesting and receiving secondary content items from the secondary content delivery networks (e.g., the internal secondary content delivery network 320, the external content delivery network 322, the internal secondary content delivery network 109, the external secondary content delivery network 131, etc.). Secondary content delivery networks may track secondary content items sent to a user device using these tokens to avoid repeated sending of a particular secondary content item to the user device. By using the token to track (e.g., anonymously track) delivery of secondary content items to the user device, a secondary content delivery network may prevent the same secondary content item from being repeatedly sent to the user device. For example, if a particular secondary content item has been sent multiple times in the last twenty-four hours, the secondary content delivery network may send another secondary content item instead of that particular secondary content item after the twenty-four hour period. As another example, if a particular secondary content item has been sent five times in the last one hour, the secondary content delivery network may send another secondary content item instead of that particular secondary content item. The user device 308 may request a token from the application management server 312. The application management server 312 may generate a token for each application present in the user device 308. Additionally, or alternatively, the application management server 312 may generate a token that can be used by all applications present in the user device 308.

The application delivering the primary content item may request the user device 308 for secondary content items that can be displayed between segments of primary content. Alternatively, the user device 308 may identify various time points during the display of the primary content item where one or more secondary content items may be inserted and outputted by the user device 308. Either the application or the user device 308 may request the secondary content items from the secondary content router 306 using the token generated by the application management system 312 for the user device 308.

The secondary content router 306 may receive the token and/or requests for secondary content items from the user device 308. The secondary content router 306 may forward the request to one or more secondary content delivery networks, such as the internal secondary content delivery network 320 (e.g., the internal secondary content delivery network 109) located in a local office (e.g., the local office 103) that is also hosting the secondary content router 306 and the external secondary content delivery network 320 (e.g., the external secondary content delivery network 131) located outside the local office. The secondary content router 306 may select one of the secondary content delivery networks 320, 322 and route the token and/or the requests for secondary content items from the user device 308 to the selected secondary content delivery network. The secondary content router 306 may also divide revenues earned by outputting secondary content items via the user device 308. A portion of the revenue may be forwarded to the manufacturer or retailer of the user device 308. Information about the manufacturer or the retailer of the user device 308 may be received from the user device 308, the user data server 318, and/or the device information sources 318 (e.g., the device information sources 133 in FIG. 1).

The user device 308 may also indicate to the application management server 312 that one or more users of the user device 308 prefer or do not prefer to receive targeted secondary content items from the secondary content delivery networks 320, 322. The user device 308 may send the preference of the one or more users to the application management server 312 along with a request for a new token. Alternatively, when a user for the user device 308 changes the user's preference for targeted secondary content items, the user device 308 may send the updated preference to the application management system 312. In another example, the user device 308 may send the user's preference for targeted secondary content items to the user data server 318 (e.g., the user data server 107 of FIG. 1), and the user data server 318 may provide the user's preference to the application management system 312.

When the secondary content router 306 receives a token and/or a request for secondary content items from the user device 308, the secondary content router 306 may determine whether the user device 308 has opted for targeted secondary content items (e.g., whether the preference of the one or more users of the user device 308 indicates that the user prefers or does not prefer targeted secondary content item). If the user device 308 has opted for targeted secondary content items, the secondary content router 306 may retrieve information related to the user device 308, a user account associated with the user device 308, and/or users of the user device 308 from the user data server 318 (e.g., the user data server 107 in FIG. 1), and forward the information to the secondary content delivery network selected by the secondary content router 306 (e.g., selected based on the stored rules by the secondary content router 306 for routing requests for secondary content items). The secondary content router 306 may also retrieve user content viewing habits, demographic characteristics, and/or psychographic characteristics associated with the users of the user device 308 from the user data server 318 (e.g., the user data server 107 in FIG. 1) and/or the user device, and forward such information to the selected secondary content delivery network. The selected secondary content delivery network may select a targeted secondary content item based on the user- and/or device-specific information provided by the secondary content router 306 and send the targeted secondary content item to the secondary content router 306. The secondary content router 306 may forward the targeted secondary content item to the user device 308 for display.

Alternatively, if the user device 308 has opted not to receive targeted secondary content items, the secondary content router 306 may forward only the token for the user device 308 to the selected secondary content delivery network. The selected secondary content delivery network may select a nontargeted secondary content item and send the nontargeted secondary content item to the secondary content router 306. The secondary content router 306 may forward the nontargeted secondary content item to the user device 308 for display.

Figure 4:
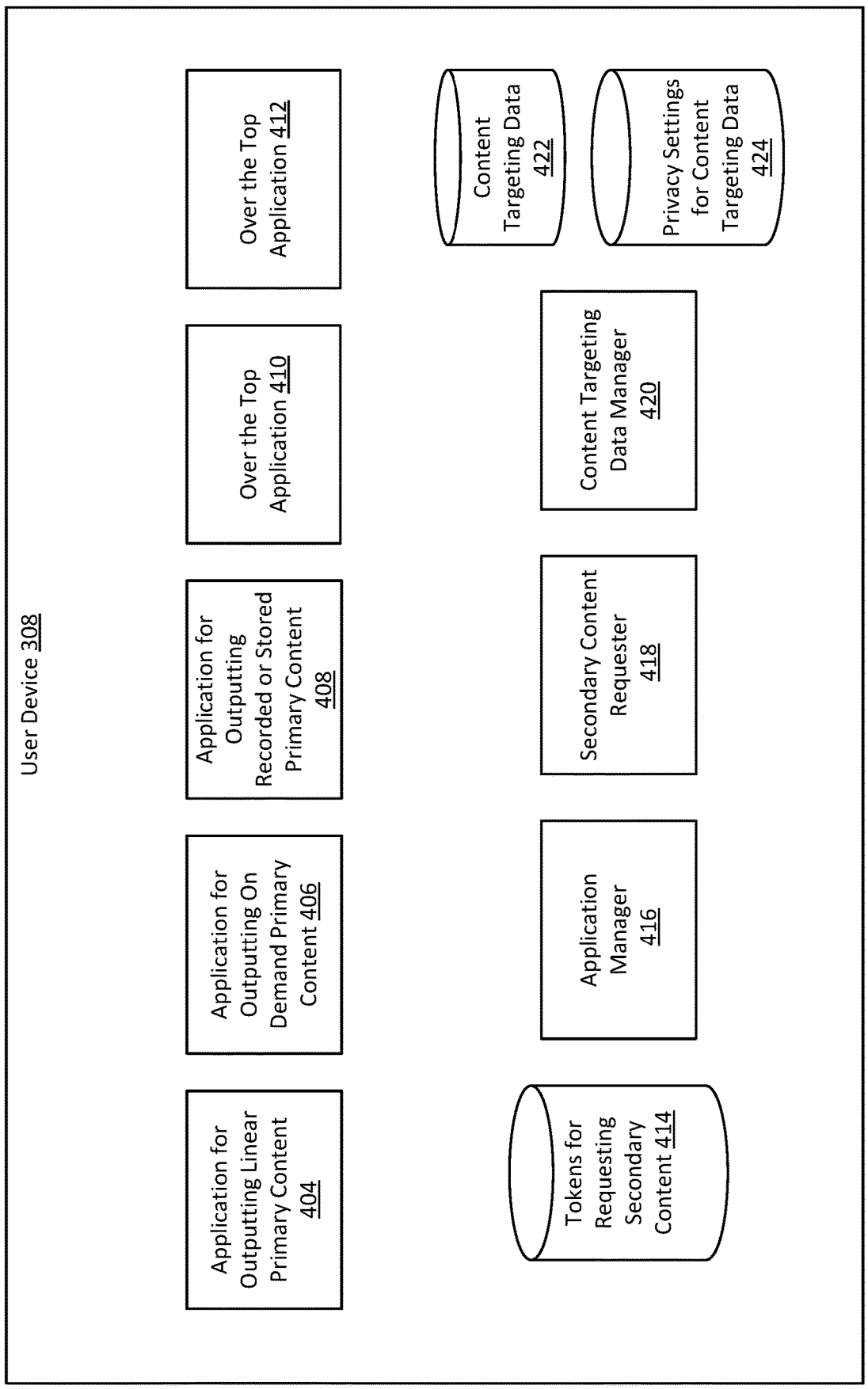
FIG. 4 shows a block diagram showing an example of a user device.

FIG. 4 shows a block diagram showing additional details of the user device 308 (e.g., any one of the user devices in the premises 102a, the mobile devices 135, the user devices 158, 160). One or more applications for primary content items may be installed in the user device 308 (e.g., the applications 404, 406, 408, 410, 412). Such applications may be downloaded from the application management server 106, the application management server 312, or any other application distribution server. Various applications present in the user device 308 may comprise an application for streaming linear primary content 404, an application for streaming on demand primary content 406, an application for streaming recorded or stored primary content 408, and over the top applications 410, 412. The application for streaming linear primary content 404 may be configured to stream linear primary content from various services. A service, for example, may comprise specific content providers, such as entities associated with "cable networks" or "broadcast networks," entities providing real-time streaming and/or download of content, selectable content collections (e.g., "content channels") assigned by a network operator, and/or any other source of content. The application for streaming on demand primary content 406 may be configured to stream on demand primary content items from one or more content sources of the network service provider associated with the user device 308 (e.g., from the internal primary content delivery network 108). The application for streaming recorded or stored primary content 408 may be configured to output primary content items recorded and stored by the user device 308 and/or by a set-top box connected to the user device 308. The over the top applications 410, 412 may be configured to stream primary content items from one or more content sources associated with the over the top applications (e.g., from the external primary content delivery network 130, the primary content delivery networks 310). Examples of over the top applications may include applications used to access specific services.

The user device 308 may also include other software components such as an application manager 416, a content targeting data manager 420, and/or a secondary content requester 418. The user device 308 may also include a database 414 for storing content targeting data 422, a database 424 to store privacy settings for the content targeting data, and/or a database 414 for storing tokens for requesting secondary content.

The database 422 for the content targeting data may store content targeting data for one or more users and/or the user device 308. The content targeting data may be used to select targeted secondary content items for the user device 308. The database 422 for the content targeting data may store content targeting data comprising user-specific data for one or more users of the user device 308 and/or device-specific data for the user device 308. The user-specific data may comprise information for a user account associated with the user device 308, a unique user account identifier identifying the user account, personal information, username, password, email address, home address, zip code, credit card information, banking information, a household identifier associated with the user account, a user account for the network service provider providing data communications capabilities to the user device 308, user accounts for various applications present in the user device 308, etc. The user-specific data may also comprise viewing data, demographic data, and/or psychographic data of various users of the user device 308. The user device 308 may be configured to monitor users' content viewing habits and collect information from that monitoring for requesting targeted secondary content items. The device-specific data may include a unique device identifier of the user device 308, Internet Protocol (IP) address of the user device 308, a Media Access Control (MAC) address of the user device 308, a serial number of the user device 308, Original Equipment Manufacturer (OEM) identifier of the user device 308, and/or identifier of the retailer of the user device 308.

The database for the privacy settings 424 may comprise personal configuration settings of the user device 308. The privacy settings may indicate whether the user device 308 prefers receiving targeted secondary content items, and whether any, some, or all of the content targeting data may be shared with secondary content delivery networks for receiving targeted secondary content items.

The applications 404, 406, 408, 410, 412 and/or the second content requester 306 may request content targeting data stored in the database 422. The content targeting data manager 420 may determine if the requested data will be used for operations related to outputting primary content items by the applications 404, 406, 408, 410, 412 (e.g., ZIP code associated with the user account of an application may be needed to initiate the operation of the application), or to request targeted secondary content items. The content targeting data manager 420 may provide the requested data to the applications 404, 406, 408, 410, 412 if the data was requested to output primary content items. However, if the content targeting data manager 420 determines that the requested data will be used to request secondary content items, the content targeting data manager may determine, based on the privacy settings stored in the database 424, whether any, some, or all of the content targeting data may be shared with secondary content delivery networks for receiving targeted secondary content items. If the privacy settings stored in the database 424 indicate that certain data (e.g., ZIP code, age groups of users, etc.) may be shared for requesting secondary content items, the content targeting data manager 420 may send the requested data to the applications 404, 406, 408, 410, 412 and/or the second content requester 306. Alternatively, if the privacy settings stored in the database 424 indicate that certain data (e.g., content viewing history) may not be shared for requesting secondary content items, the content targeting data manager 420 may decline to send the requested data to the applications 404, 406, 408, 410, 412 and/or the second content requester 306.

The database 414 for tokens may comprise various tokens assigned to the user device 308. The application manager 416 may request tokens for the user device 308 and/or various applications in the user device 308 (e.g., the applications 404, 406, 408, 410, 412) and store the tokens in the database 414. The tokens may comprise a unique identifier (of a string data type or a universally unique identifier (UUID)) for the user device 308. The application manager 416 may request a new token whenever one of the various applications in the user device 308 (e.g., the applications 404, 406, 408, 410, 412) is initiated for streaming primary content items. Additionally, the application manager 416 may receive tokens from the application management system 312 without requesting a new token.

The secondary content requester 418 may receive a request for secondary content items from one of the various applications in the user device 308 (e.g., the applications 404, 406, 408, 410, 412). After receiving the request, the secondary content requester 418 may choose a token from the database 414 and send the token and the request to the secondary content router 306. The secondary content requester 418 may receive any secondary content items sent by the secondary content router 306 and forward the received secondary content items to the application from which the secondary content requester received the request for secondary content items.

Figure 5:
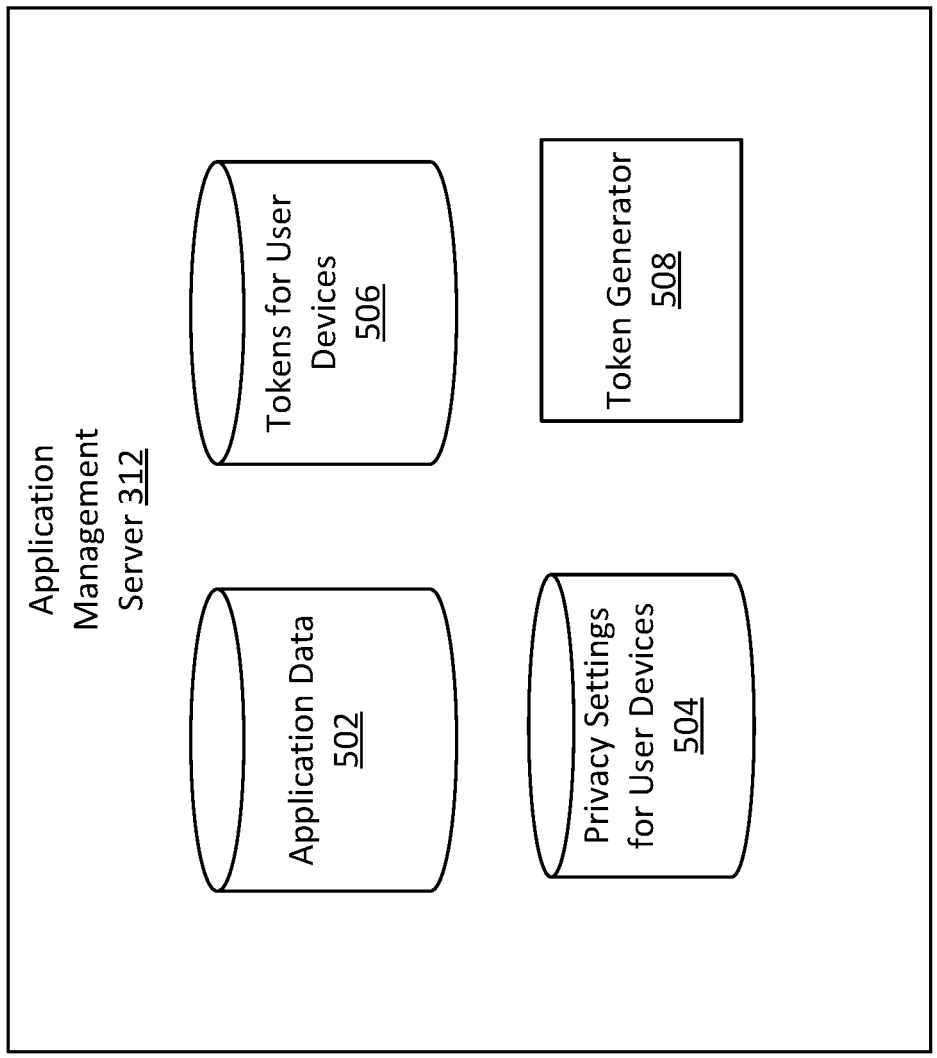
FIG. 5 shows a block diagram showing an example of an application management server.

FIG. 5 shows a block diagram showing additional details of the application management server 312. The application management server 312 may comprise various software components, such as the token generator 508 that may create new tokens. The application management system 304 may also include a database 502 for storing data for different applications, a database 506 for storing the generated tokens, and/or a database 504 for storing privacy settings of various user devices (e.g., data indicating whether users of the user devices have opted in or out of targeted secondary content items). The data for the different applications stored in the database 502 may comprise identifiers of the different applications, versions of the applications, hashed values used to authenticate users to use the application, address for the secondary content router 306, addresses for secondary content delivery networks where requests for secondary content items requested by an application may be sent, rules for how to divide revenues earned by outputting secondary content items at the user device among different recipients (e.g., the local office 103, entities associated with the applications, manufacturers of the user device, retailer of the user device), etc. The database 502 may also comprise software installation packages for one or more applications (e.g., the applications 404, 406, 408, 410, 412). The tokens generated for various user devices (e.g., the user device 308, any one of the user devices in the premises 102, the mobile devices 135) may be stored in the database 506 configured to store tokens of the user devices.

The token generator 508 may be configured to receive a request for a token from an application present in a user device. The token generator 508 may generate a new token and send the token to the user device. The token generator 508 may also send data regarding the application, addresses for the secondary content router 308, addresses for secondary content delivery networks, and/or rules for diving revenue stored in the database 502 to the user device.

Figure 6:
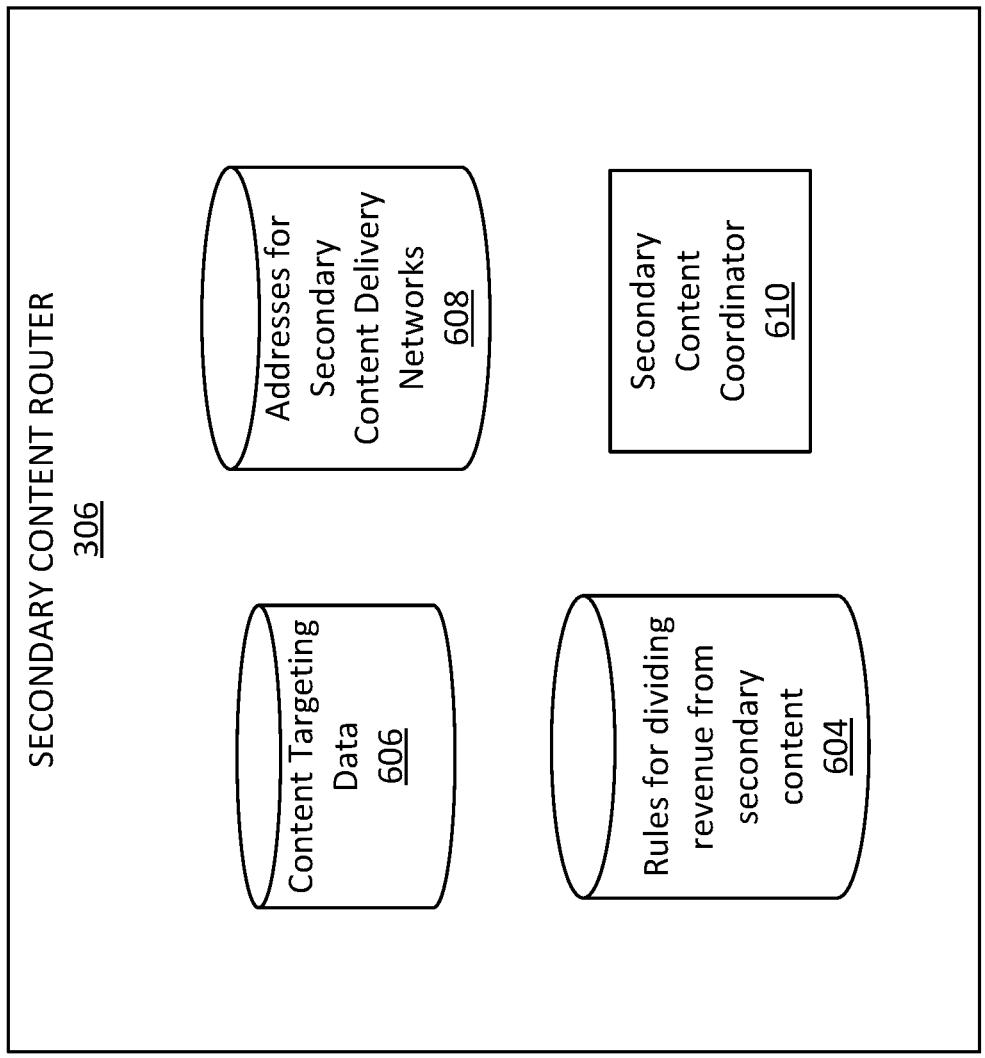
FIG. 6 shows a block diagram showing an example of a secondary content router.

FIG. 6 shows a block diagram showing additional details of the secondary content router 306. The secondary content router 306 may comprise a software component, such as a secondary content coordinator 610. Addresses (e.g., Internal Protocol (IP) address, Media Access Control (MAC) address) for the various secondary content delivery networks (e.g., one of the secondary content delivery networks 320, 322, the internal secondary content delivery network 109, the external secondary content delivery network 131, etc.) may be stored in the database 608.

The secondary content router 306 may also include a database 604 that stores rules for dividing the revenue, gained by outputting secondary content to the user devices, among different recipients of the revenue. The recipients may comprise one or more of an entity associated with the local office (e.g., the local office 103) hosting the secondary content router 306, entities (e.g., companies) providing and/or otherwise associated with various applications installed in the user devices, entities providing and/or otherwise associated with external primary or secondary content delivery networks, any manufacturer and/or retailer of the user devices, etc. The secondary content router 306 may also include a database 606 for storing content targeting data for user devices and/or users of the user devices. The content targeting data stored in the database 606 for a user and/or a user device may be forwarded to a secondary content delivery network to select targeted secondary content items for output at the user device if the user has opted for receiving targeted secondary content items. The database 606 for storing the content targeting data may store user-specific data of the users and/or device-specific data for the user devices.

When the secondary content coordinator 610 receives a token and/or a request for secondary content items from a user device (e.g., the user device 308, any one of the user devices in the premises 102, the mobile devices 135), the secondary content coordinator 610 may also receive an address or an identifier for a secondary content delivery network where the token and/or the request may be forwarded. Alternatively, the secondary content coordinator 610 may select, from the database 608, a secondary content delivery network to which the request for the secondary content items will be forwarded. After receiving the secondary content items from the selected secondary content delivery network, the secondary content coordinator 610 may forward the received secondary content items to the user device that requested the secondary content items.

Figure 7A:
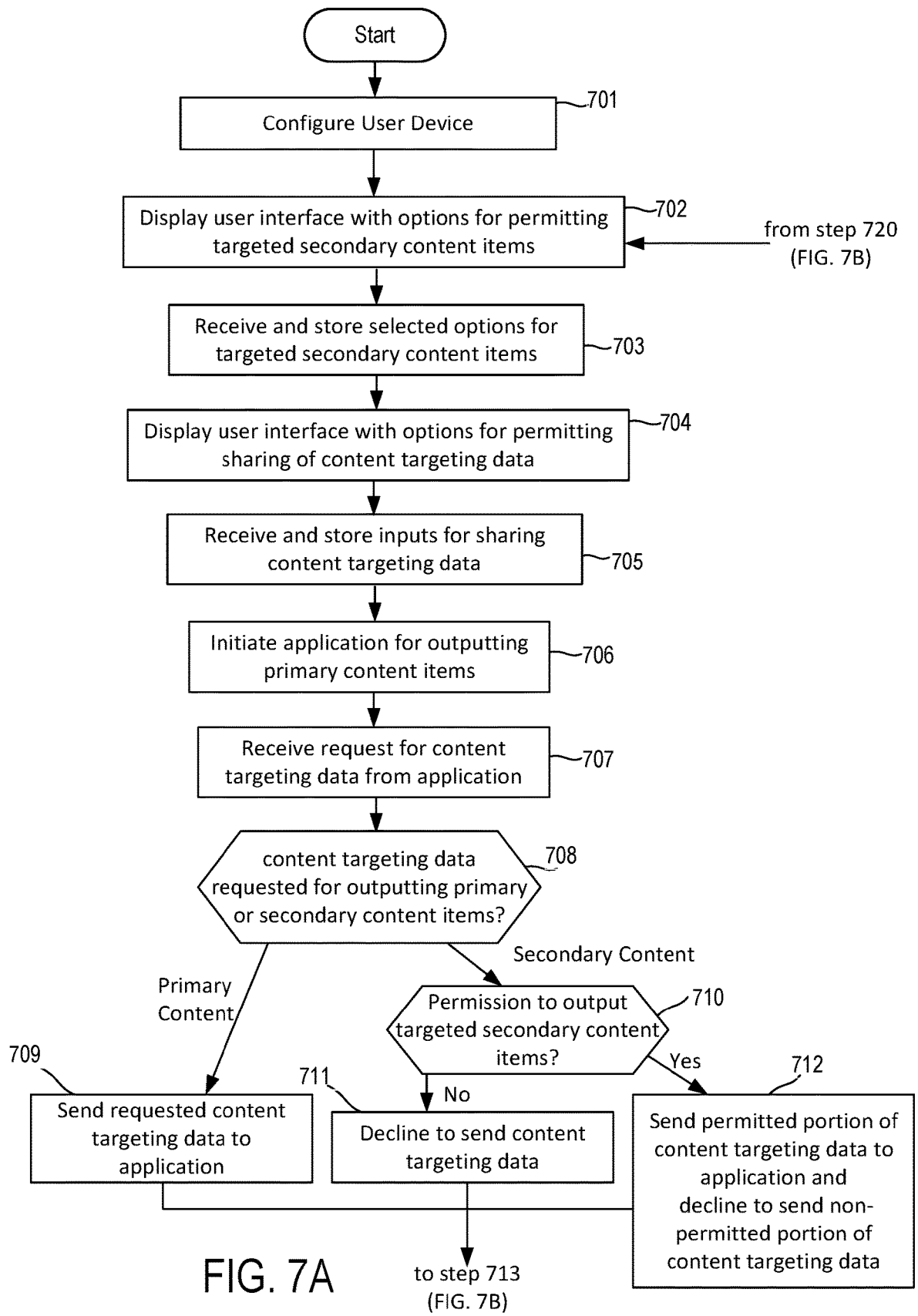
FIGS. 7A and 7B show a flow chart showing steps of an example method for a user device to output primary and secondary content.
Figure 7B:
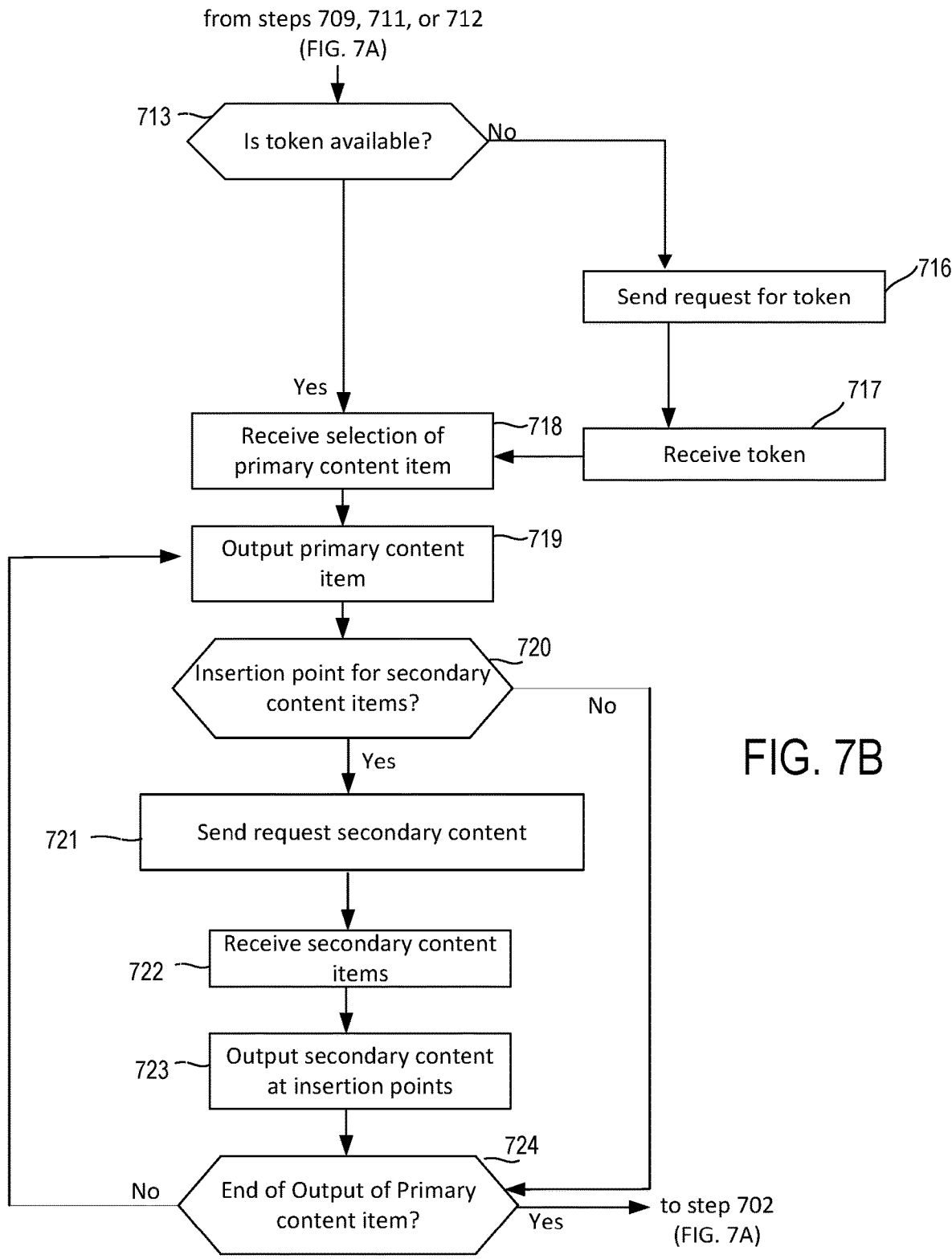

FIGS. 7A and 7B are a flow chart showing an example method for outputting primary and secondary content items by a user device. For convenience, FIGS. 7A and 7B are described by example of performance of the method by the user device 308. However, the method of FIGS. 7A and 7B may also or alternatively be performed by another user device (e.g., any one of the user devices in the premises 102a, the mobile devices 135). The steps in FIGS. 7A and 7B may be performed by various software components of the user device 308, such as the applications 404, 406, 408, 410, 412, the application manager 416, the secondary content requester 418, and/or the content targeting data manager 420 in FIG. 4. One, some, or all steps of the method may also or alternatively be performed by one or more other computing devices (e.g., a computing device other than a user device). One, some, or all of the steps may be rearranged or otherwise modified. Steps may be omitted and/or other steps added.

In step 701, the user device 308 may be configured to request, receive, and output primary content items from various primary content delivery networks (e.g., internal primary content delivery networks 108, the external primary content delivery networks 130, primary content delivery networks 310, etc.) and/or secondary content items from various secondary content delivery networks (e.g., one of the secondary content delivery networks 320, 322, the internal secondary content delivery network 109, the external secondary content delivery network 131, etc.). Configuring the user device 308 to request, receive, and output the secondary content items may comprise downloading a software installation package, installing the software installation package, configuring the user device to communicate with the secondary content router 306 in FIG. 3, and downloading and/or creating the database 414 for storing tokens for requesting secondary content items, the database 422 for storing content targeting data, the database 424 for storing privacy settings for the content targeting data, and any of the other data described herein. The database 422 for storing content targeting data may comprise user-specific data, such as information for a user account associated with the user device, a unique user account identifier identifying the user account, personal information, username, password, email address, home address, zip code, credit card information, banking information, a household identifier associated with the user account, etc. The content targeting data may also comprise viewing data, demographic data, and/or psychographic data of various users of the user device 308. The user device 308 may be configured for monitoring content viewing habits of users and collecting information from that monitoring for requested targeted secondary content items. The device-specific data may include a unique device identifier of the user device 308, Internet Protocol address of the user device 308, serial number of the user device 308, Original Equipment Manufacturer (OEM) identifier of the user device 308, and/or identifier of the retailer of the user device 308.

Configuring the user device 308 to request, receive, and output the primary content items may comprise communicating with an application management server (e.g., the application management server 312 in FIG. 3, the application management server 106 in FIG. 1, or any other application distribution server external to the local office 103 in FIG. 1) to download one or more software installation packages for one or more applications (e.g., the applications 404, 406, 408, 410, 412), installing the software installation packages, configuring the applications to communicate with the primary content delivery networks and some or all of the other elements of the user device 308 in FIG. 4 (e.g., the application manager 416, the secondary content requester 418, the content targeting data manager 420, the database 414 for storing tokens for requesting secondary content items, the database 422 for storing content targeting data, and/or the database 424 for storing privacy settings for the content targeting data). Additionally, some of the applications may be installed in the user device 308 (e.g., the application 404 for streaming linear primary content items, the application 406 for streaming on demand primary content items, and/or the application 408 for outputting recorded or stored primary content items) before the user device 308 is sold or provided to a user.

The user device 308 may be further configured to monitor content viewing habits and/or behaviors of one or more users of the user device 308 and/or other devices (e.g., any of the devices 123-127) and collect information from that monitoring for use by a secondary content router (e.g., the secondary content router 306) to request targeted secondary content items. The information about the content viewing habits and/or behaviors of the users may comprise viewing data indicating primary content viewing history of the users, frequently viewed genres of primary content items by the users, viewing times associated with the different primary content items and/or genres, and/or other primary content viewing characteristics. For example, the viewing data for a user may show that the user likes watching soap operas on weekdays, but crime series on weekends. The viewing data may comprise viewing history of various applications in the user device. The viewing data may also or alternatively be based on the most frequently used applications. The user device 308 may send the information about the content viewing habits and/or behaviors of the users to the user data server 318, and/or store the information in the database 422 for storing content targeting data.

The user device 308 may also be configured to determine demographic and/or psychographic data associated with the users. The demographic data associated with the users may comprise data indicating one or more of age, gender, sexual orientation, race, marital status, number and/ages of children, occupation, income, education level, political affiliation, religious affiliation, nationality, and/or any other characteristics. The demographic data for the user may be determined, e.g., based on a ZIP code, a geographic location, and/or any other data associated with that user and/or other users. The psychographic data associated with the users may comprise personal preferences, opinions on certain products, interests, activities, lifestyles, subject matter expertise, and/or other characteristics of the users. The demographic and/or psychographic data associated with the users may be determined from various sources, such as textual input data (e.g., electronic communications submitted by the users, such as social media posts, product reviews, blogs, articles, papers, email messages, text messages, etc.), clickstream data (e.g., information related to what webpages a user visits, how long he/she remains on a web page, hyperlinks selected, and generally, any information related to a succession of selections made by the user via mouse clicks and/or touch screen selections), past-purchase information (e.g., data indicating a number of purchases completed by a user as well as data identifying the purchased items), survey response data (e.g., responses provided by a user in response to one or more questionnaires), population and housing censuses, and/or education, health, and employment statistics. The user device 308 may send the information about the demographic and/or psychographic data of the users to the user data server 318 and/or store the information in the database 422 for storing content targeting data.

Referring back to FIG. 7A, privacy may be an important concern to a user of the user device 308, and the user may prefer not to receive targeted secondary content items. In step 702, the user may be prompted, by displaying one or more user interfaces, to indicate whether the user prefers to view targeted secondary content items. The user interfaces may prompt the user to indicate whether the user wants to receive targeted secondary content items when viewing primary content items from all or some of the applications present in the user device 308. FIG. 8A shows an example user interface 802 that may be displayed to the user. The user interface 802 in FIG. 8A may ask the user to select the applications in the user device that may be permitted to request and display targeted secondary content items. The user may choose to allow only some of the applications to display targeted secondary content items (e.g., only application B is selected to display targeted secondary content items in FIG. 8A). Alternatively, the user may choose to allow none or all the applications in the user device to display targeted secondary content items (e.g., by selecting the all applications option in FIG. 8A). At step 703, the user device may receive the one or options selected by the user via the user interface displayed at step 702 and store the options (e.g., in the database 424 for storing privacy settings for content targeting data).

If the user allows some or all of the applications to display targeted secondary content items, at step 704, the user may be prompted to indicate what content targeting data may be shared with secondary content delivery networks (e.g., one of the secondary content delivery networks 320, 322, the internal secondary content delivery network 109, the external secondary content delivery network 131, etc.) when requesting the secondary content items. FIG. 8B illustrates an example user interface 804 that may be displayed to the user. The user interface 804 may provide the user options to share, for purposes of selection of targeted secondary content items, an identifier associated with the user, an identifier associated with the user device, the user's account number with a network service provider, Internet Protocol (IP) address of the user device, address, country, and/or zip code of the user, a Designated Market Area (DMA) of the user, information about the primary content items being displayed by the user device 308, genre of the primary content items being displayed, user rating for the displayed primary content items, primary content viewing data of the user, demographic data of the user, psychographic data of the user, and/or other data. The user device 308 may use selected data in the user interface 804 with secondary content delivery networks to request targeted secondary content items. At step 705, the user device 308 may receive the one or options selected by the user via the user interface displayed at step 704 and store the options (e.g., in the database 424 for storing privacy settings for content targeting data).

At step 706, the user device 308 may initiate execution of an application installed on the user device (e.g., initiate execution of any one of the applications 404, 406, 408, 410, 412). The application may be initiated after the user device 308 receives user inputs (e.g., via a remote control, mouse clicks, and/or touch screen selections) requesting the user device 308 to initiate the application such that the user device 308 may view primary content items via the application, and/or view primary content items available for viewing via the application.

At step 707, the application, initiated at step 706, may request content targeting data from the content targeting data manager 420 of the user device 308. The content targeting data requested by the application may be available or stored in the database 422 for content targeting data. For example, the application may request, among other content targeting data, the identifier of a user account associated with the user device 308 or the application, an email address, zip code, a unique device identifier of the user device 308, and/or the IP address of the user device 308.

Figure 9:
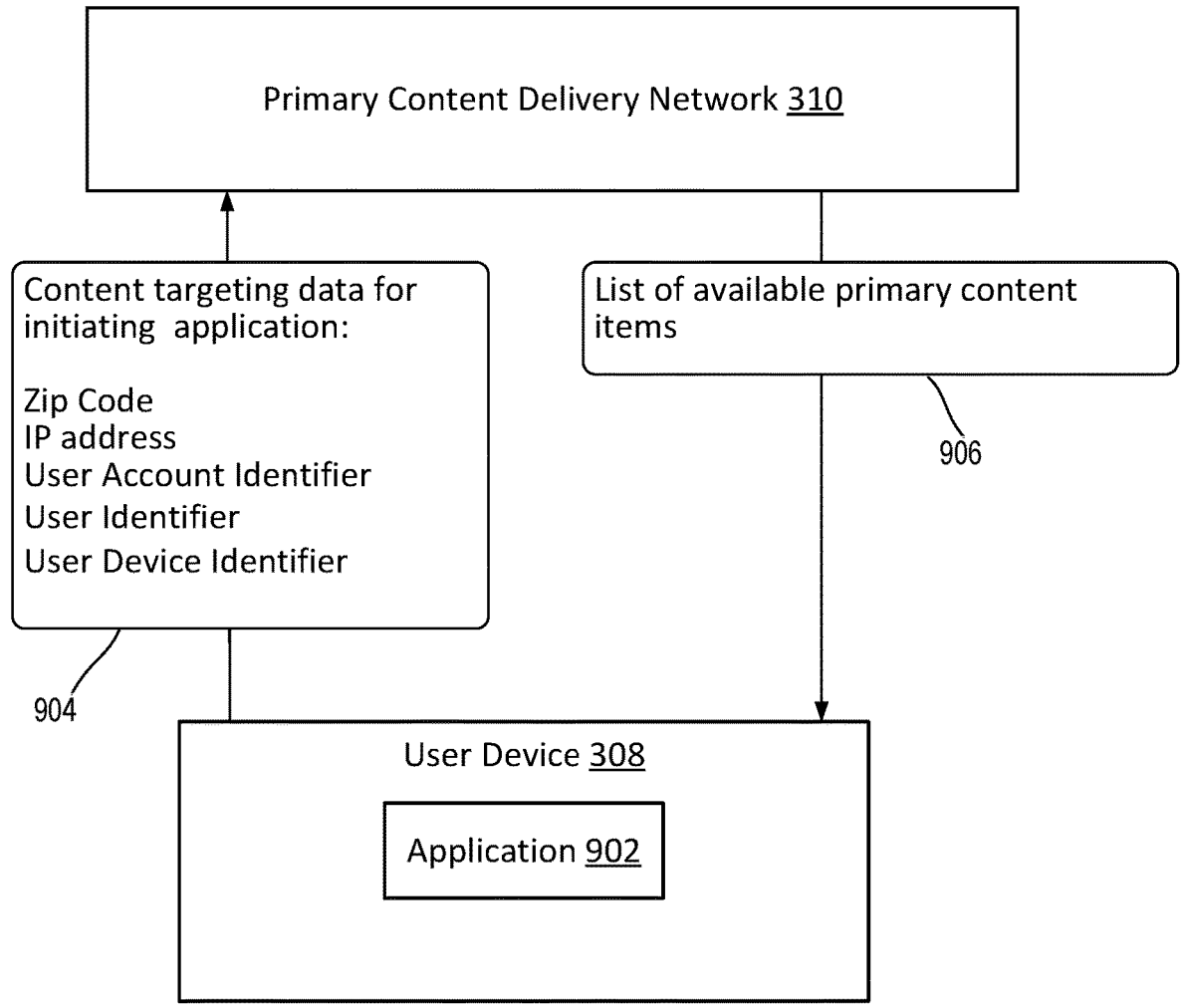
FIG. 9 is a diagram showing example communications and/or data flow between a user device and a primary content delivery network for outputting a list of primary content items.

After receiving the request for the content targeting data from the application, the content targeting data manager 420 of the user device 308 may determine, at step 708, whether the content targeting data requested by the application will be used to select and/or cause the output of primary content items (e.g., whether the requested content targeting data will be used for the operations of the application, such as initiating the application, displaying available video or audio programs available for outputting by the application, displaying available television or radio channels for streaming, and/or outputting video or audio programs) or secondary content items (e.g., whether the requested content targeting data will be used to select and/or output advertisements). For example, the content targeting data manager 420 of the user device 308 may determine whether the content targeting data will be used to start execution of the application and/or display available primary content items available for outputting by the application. As shown in FIG. 9, an application (e.g., the application 902) may provide information 904 to the primary content delivery network 310 to initiate the application and receive a list of available primary content 906 that can be displayed via the user device 308. The information 904 may comprise a user account associated with the application and/or the network service provider of the user device 308 or an email account associated with the user account for the application, an identifier for a user, an identifier for the user device 308, and/or other data. Additionally, the information 904 may comprise a zip code where the user device 308 is located or IP address of the user device 308 such that information about primary content items available from local services (e.g., local radio stations, local television stations, etc.) may be displayed. The application may also request the IP address of the user device 308 to send, to the primary content delivery network 310 associated with the application, a request for a list of primary content items 906 (FIG. 9) available for display or a request for the primary content item. If the content targeting data manager 420 determines that the application has requested content targeting data to start execution of the application, display available primary content items available for outputting by the application, and/or cause outputting of a primary content item by the application, at step 709, the content targeting data manager 420 may send the requested content targeting data to the application, and step 713 in FIG. 7B may be performed.

Alternatively, a user of the user device 308 may indicate that the user prefers not to share content viewing habits and/or behaviors, demographic characteristics, and/or psychographic characteristics of the user even if the application is requesting the data to determine a list of primary content items available for outputting by the application to the users (e.g., display a list of primary content items 906 that are preferred by the users). In such a case, the content targeting data manager may decline to share the content viewing habits and/or behaviors, demographic characteristics, and/or psychographic characteristics of the users with the application.

If the content targeting data manager 420 determines at step 708 that the application requested the content targeting data for requesting secondary content items, step 710 may be performed. At step 710, the content targeting data manager 420 may determine if the user has given permission to the application or the user device 308 to output targeted secondary content items. For example, the content targeting data manager 420 may access the information stored in the database 424 that stored the user inputs from the user interfaces displayed at step 702 to determine whether the application or all of the applications installed on the user device 308 have permission to output targeted secondary content items and/or whether the user device 308 has permission to share the content targeting data for receiving targeted secondary content items. If the content targeting data manager 420 determines that the user device 308 does not have the permission to share the content targeting data, at step 711, the content targeting data manager 420 may decline to send or provide the requested content targeting data to the application, and step 713 (FIG. 7B) may be performed. The content targeting data manager 420 may send a message to the application indicating that the request has been declined.

If the content targeting data manager 420 determines at step 710 that the requesting application or all of the applications installed on the user device have permission to output targeted secondary content items and/or that the user device 308 has permission to share some portions of the requested content targeting data for targeted secondary content items, step 712 may be performed. The content targeting data manager 420 may access the information stored in the database 424 for storing the privacy settings for content targeting data to determine whether some or all of the requested content targeting data may be shared for targeted secondary content items. For example, as shown in FIG. 8B, a user may have given permission to the user device 308 to share the user's ZIP code and/or genre of the primary content item being outputted by the application. However, the user may not have given permission for the user device 308 to share any other content targeting data, such as the primary content viewing habits and/or behaviors, demographic characteristics, and/or psychographic characteristics of the users as shown in FIG. 8B. If the content targeting data manager 420 determines that the user device 308 has permission to share the requested content targeting data (e.g., zip code or primary content item being outputted by the application as shown in FIG. 8B), the content targeting data manager 420 may at step 712 provide the permitted content targeting data. If the content targeting data manager 420 does not have permission to share the content targeting data (e.g., primary content viewing habits and/or behaviors, demographic characteristics, and/or psychographic characteristics of the users as shown in FIG. 8B), the content targeting data manager 420 may decline to send or provide the non-permitted content targeting data to the application or a secondary content delivery network. In addition, the content targeting data manager 420 may send a message to the application indicating that the request has been declined.

Alternatively, at step 712, the content targeting data manager 420 may determine that the application has requested both permitted and non-permitted content targeting data. For example, the application may request both the zip code and demographic characteristics, and the content targeting data manager 420 may decline to send the demographic characteristics as the privacy settings in the database 424 indicate that the demographic characteristics may not be shared for requesting targeted secondary content items. The content targeting data manager 420 may send a message to the application indicating that the request has been partially declined, and only the permitted content targeting data (e.g., the zip code) will be provided. Based on performing step 709, step 711, or step 712, step 713 in FIG. 7B may be performed.

At step 713 of FIG. 7B, the user device 308 may determine whether a token is available for use, by the application initiated in step 706, to request secondary content items. For example, the application manager 416 may access the database 414 that stores tokens for requesting secondary content items, and determine if the database 414 has a token that the application can use. The application manager 416 may determine whether there is a token in the database 414 for the particular application or a token that may be used by any applications installed on the user device 308. If the token manager 416 does not find an available token, the token manager 416 may request a new token at step 716. If the token manager 416 determines that a token is available, step 718 may be performed.

Figure 10:
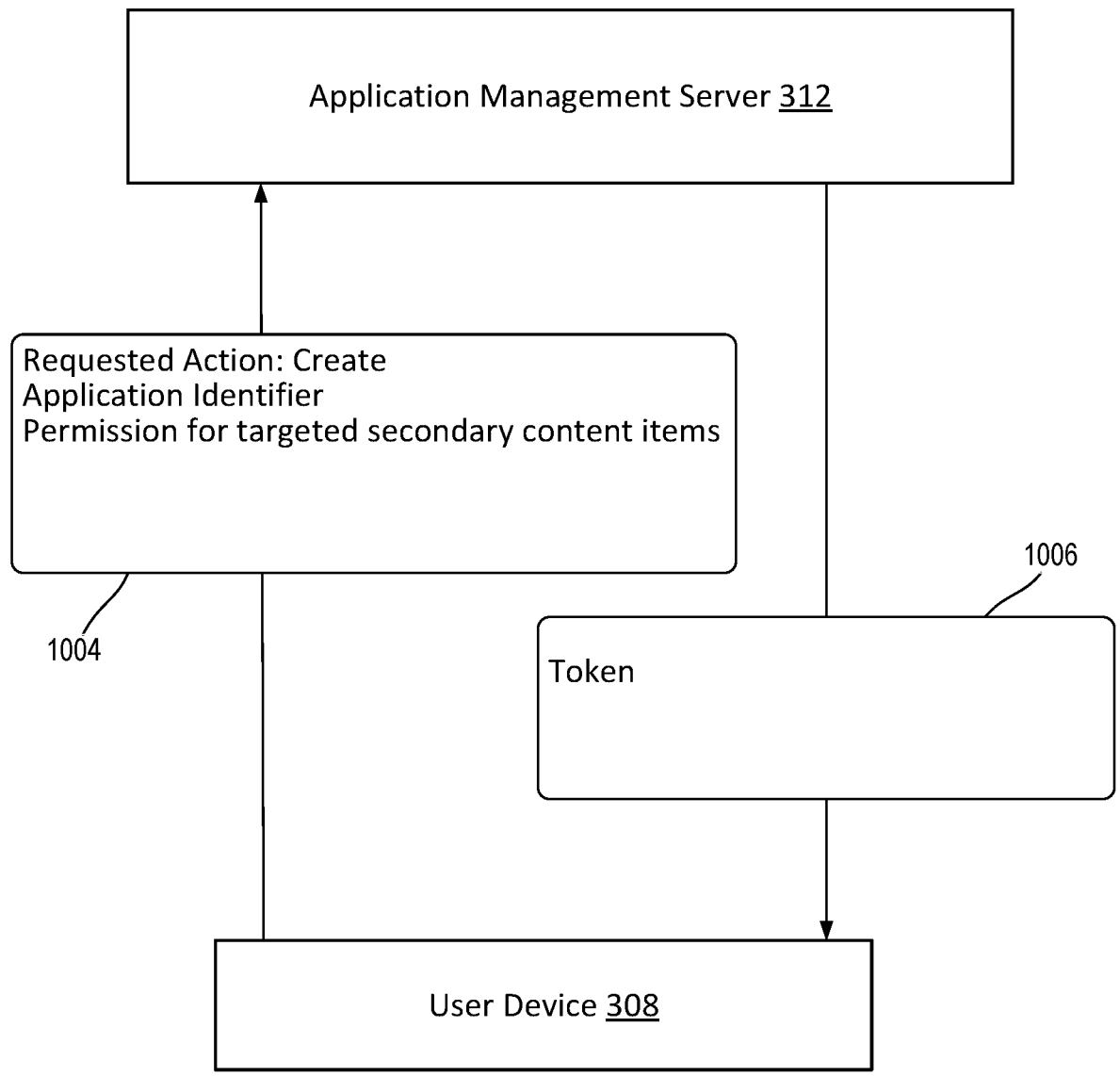
FIG. 10 is a diagram showing example communications and/or data flow between a user device and an application management server.

At step 716, if a new token is needed, the user device 308 may send a request for a new token to the application management system 312. FIG. 10 shows example communications and/or data flow between the application management system 312 and the user device 308. To request a new token, the user device 308 may send a request 1004 to the application management system 312, where the request 1004 may comprise additional data. The application management system 312 may use the additional data in the request 1004 to generate a new token. The additional data in the request 1004 may indicate an action requested from the token management system 304 (e.g., create a new token), an identifier for an application for which the token is requested (e.g., an identifier for any one of the applications 404, 406, 408, 410, 412), and/or an indication of whether the application or the user device 308 has permission to display targeted secondary content items. At step 717, a new token (e.g., token 1006 in FIG. 10) may be received by the user device 308 and stored (e.g., stored in the database 414 for storing tokens for requesting secondary content).

Figure 11:
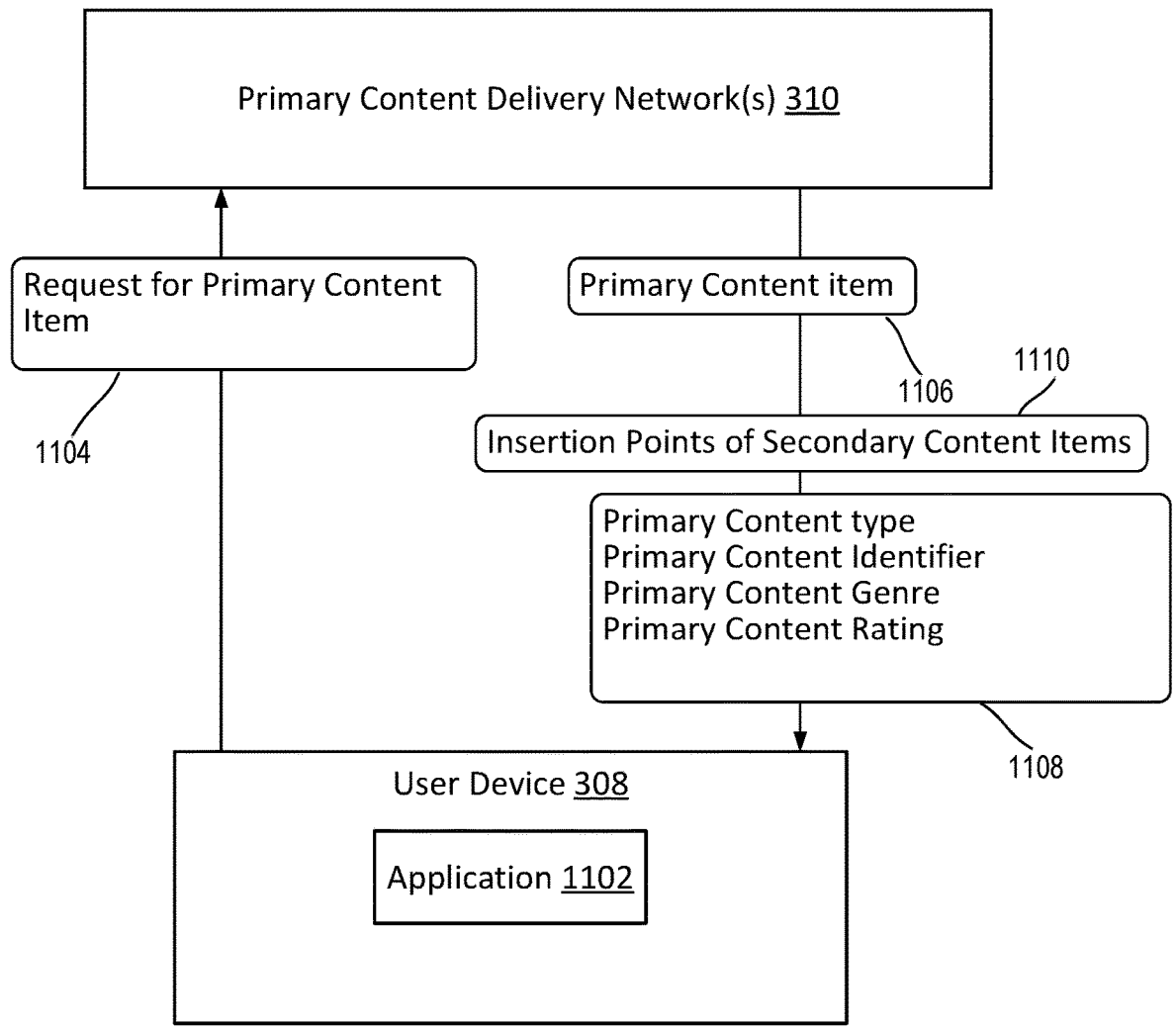
FIG. 11 is a diagram showing example communications and/or data flow between a user device and a primary content delivery network for outputting primary content items.

At step 718, the application initiated at step 706 may display a list of primary content items available for outputting via the application and receive user inputs (e.g., via a remote control, mouse clicks, and/or touch screen selections) for the selection of a primary content item from the list. At step 719, the application may start outputting a primary content item (e.g., a movie, a sporting event, a documentary, or an episode of a series). The application may send a request to a primary content delivery network for the selected primary content item. For example, FIG. 11 shows example communications and/or data flow between the user device 308 hosting an application 1102 and a primary content delivery network (e.g., a primary content delivery network 310). The application 1102 may send a request 1104 for the selected primary content item and receive data packets and/or data streams comprising the selected primary content item 1106. The application 1102 may also receive other data 1108 associated with the selected primary content item. The other data 1108 may comprise an indication of the type of the selected content item (e.g., a movie, an episode of a series, a documentary, etc.), an identifier for the primary content item, a genre associated with the selected primary content item, and/or other data. After receiving the selected primary content, the application may output the primary content item (e.g., display the primary content item via a screen of the user device, and/or display the primary content item via a screen of another device connected wirelessly or through wires to the user device).

At step 720, during or before the output of the primary content item, the application of step 706 may determine whether there are one or more insertion points in the primary content item where secondary content items may be inserted and displayed. For example, as shown in FIG. 11, while receiving the selected primary content item 1106 from the primary content delivery network 310, the application 1102 may also receive indications of various insertion points 1110 in the primary content item 1106 where secondary content items may be inserted and displayed along with the primary content item 1106. For example, for a primary content item of twenty-five minutes in length, one or more secondary content items may be inserted at a twelve-minute point in a run-time of the primary content item 1106 and at a twenty-minute point in the run-time of the primary content item 1106. The insertion points 1110 may also indicate the duration of slots, associated with the insertion points, into which secondary content items may be inserted. For example, the insertion points 1110 for the primary content item 1106 may indicate that two minutes of secondary content items will be inserted beginning at the twelve-minute insertion point, and three minutes of secondary content items may be inserted beginning at the twenty-minute insertion point. If the application determines that there are no insertion points, step 724 may be performed. If the application determines that there are one or more insertion points, step 721 may be performed.

Figure 12:
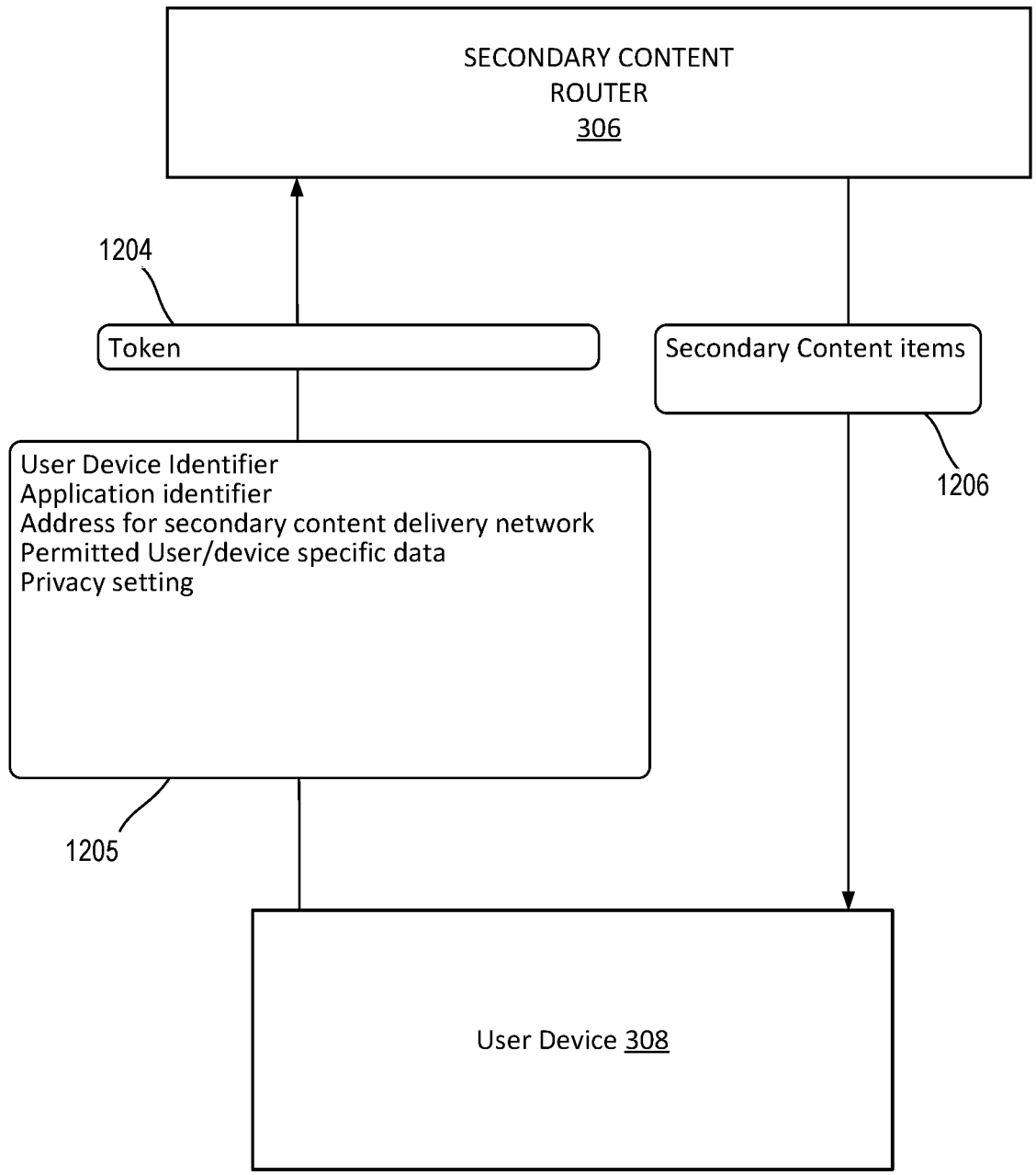
FIG. 12 is a diagram showing example communications and/or data flow between a user device and a secondary content router.

At step 721, the user device 308 may send, to the secondary content router 306, a request for secondary content items. The request may comprise a token. FIG. 12 shows example communications and/or data flow between the user device 308 and the secondary content router 306. The user device may send a request to the secondary content router 306 to deliver one or more secondary content items to the user device 308. The request may comprise the token 1204 (e.g., the token identified at step 713 or the token received at step 717). The user device 308 may also send other data 1205 in addition to the token 1404. The secondary content router 306 may use the other data 1205 to select a secondary content delivery network for forwarding the token and the request. The other data 1205 may comprise an identifier for a secondary content delivery network to which the token and/or the request should be forwarded, an identifier for the user device 308, an identifier for the application requesting the secondary content items, and/or other data. Additionally, if the user device 308 or the application has permission to output targeted secondary content items, the user device 308 may also send the permitted content targeting data determined at step 712 to the secondary content router 306 such that the secondary content router 306 may use the permitted content targeting data to deliver targeted secondary content items to the user device 308.

At step 722, the user device 308 may receive one or more secondary content items (e.g., the secondary content items 1206 in FIG. 12) from the secondary content router 306. The user device may send the received secondary content items to the application displaying the primary content item. The application may output the received secondary content item at step 723 via one or more insertion points during the output of the primary content item. Finally, at step 724, it may be determined whether the output of the primary content item has ended (e.g., if the user stopped watching the primary content item, closed the application, switched to a different screen, etc.). If the output of the primary content item has ended, step 701 (FIG. 7A) may be performed. If the output of the primary content item has not ended, step 720 may be performed, and new insertions points may be determined.

Figure 13:
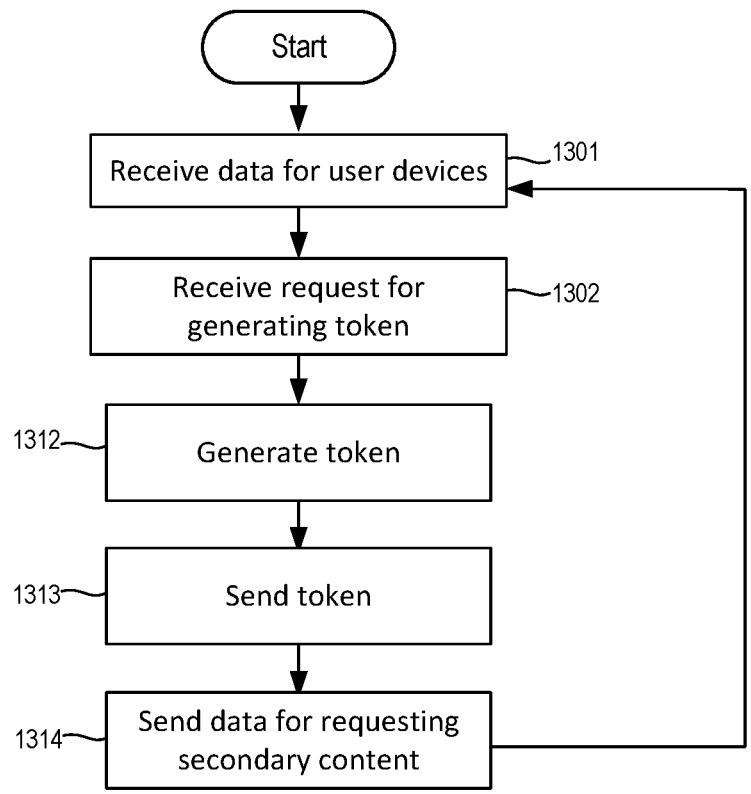
FIG. 13 shows a flow chart showing steps of an example method for an application management server.

FIG. 13 is a flow chart showing an example method for managing tokens by an application management system (e.g., the application management server 312). For convenience, FIG. 13 is described by example of performance of the method by the application management server 312. One, some, or all steps of the method may also or alternatively be performed by one or more other computing devices (e.g., a computing device other than an application management server). One, some, or all of the steps may be rearranged or otherwise modified. Steps may be omitted and/or other steps added.

In order to create and manage tokens for user devices, the application management system 312 may be provided with information about the user devices (e.g., the user device's user account for a network service provider, privacy settings for the user device, or the user account, etc.). In step 1301, the application management server 312 may receive data about the user devices requesting tokens from the application management server 312. The application management server 312 may receive the data about the user devices from a user data server (e.g., the user data server 107, the user data server 318) located in the local office (e.g., the local office 103) that is also hosting the application management server 312.

Figure 14:
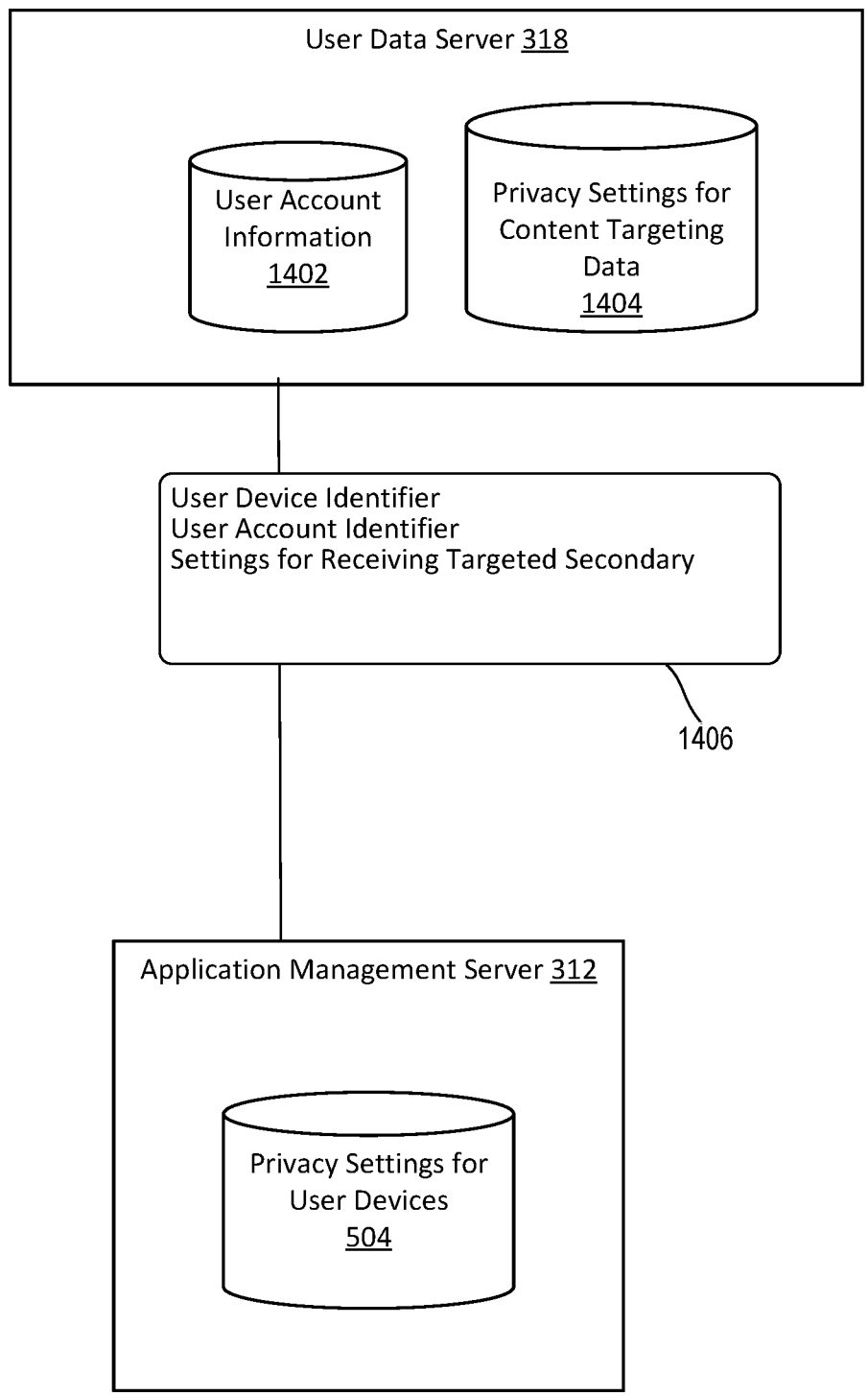
FIG. 14 is a diagram showing example communications and/or data flow between a user data server and an application management server.

FIG. 14 shows example communications and/or data flow between the user data server 318 and the application management server 312. The user data server 318 may comprise various databases, such as the database 1402 for storing user account information and the database 1404 for storing the various privacy settings for the content targeting data of the user devices. The database 1402 may store profile information for each user account, including a unique account identifier identifying the user account, personal information, username, password, email address, home address, credit card information, banking information, etc. The database 1402 may also store user device identifiers of various user devices using the user accounts to access the networks used by the network service provider. The database 1404 may store privacy settings that indicate whether the user devices associated with a user account prefer to receive targeted secondary content items. Information 1406 about the various user devices may be sent once or periodically (e.g., once a day, once a week, once a month) from the user data server 318 to the application management server 312. Information 1406 may comprise unique account identifiers of the user accounts in the network service provider, user device identifiers of the user devices using the user accounts, settings that indicate whether the user devices prefer or have permitted receiving targeted secondary content items, and/or other data. The application management server 312 may store the information 1406 received from the user data server 318 (e.g., the information 1406 may be stored in the database 504 for storing privacy settings of user devices).

Referring back to FIG. 13, at step 1302, the application management server 312 may receive a request to generate a token for a user device (e.g., the user device 308). As shown in FIG. 10, the user device 308 may send additional data 1004 along with the request for a new or updated token from the user device. The additional data 1004 may indicate an action requested from the application management server 312 (e.g., create a new token), an identifier an application for which the token is requested (e.g., an identifier for any one of the applications 404, 406, 408, 410, 412), and/or an indication of whether the application or the user device has permission to display targeted secondary content items.

At step 1312, the application management server 312 may generate the requested token. The new token may be assigned a unique identifier that various secondary content delivery networks may use to identify the user device. After generating the new token at step 1312, the application management server 312 may send the new token to the user device 308 at step 1313. The application management server 312 may store the new token (e.g., stored in the database 506 for storing tokens for user devices).

At step 1314, the application management server may send data to the user device 308, and the user device 308 may use the data for requesting secondary content items. The data may comprise addresses for the secondary content router 308, addresses for secondary content delivery networks where requests from the user device may be forwarded, and/or rules for dividing revenue from secondary content outputted at the user device 308. After that, step 1301 may be performed.

Figure 15:
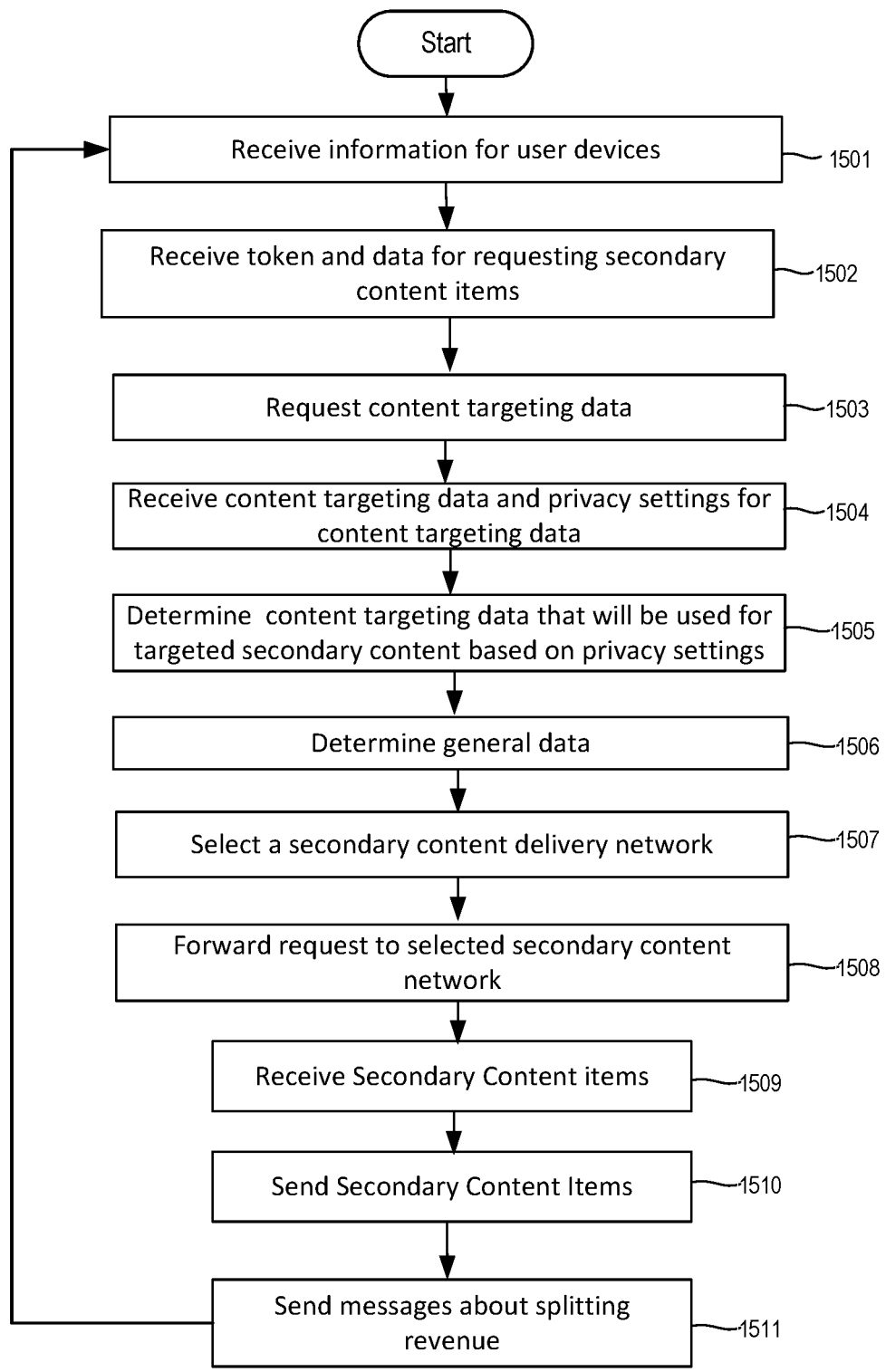
FIG. 15 shows a flow chart showing steps of an example method for a secondary content router to provide secondary content to user devices.

FIG. 15 shows a flow chart showing an example method for providing secondary content items to a user device (e.g., any one of the user devices in the premises 102, the mobile devices 135, the user device 308) by a secondary content router. For convenience, FIG. 15 is described by example of performance of the method by the secondary content router 306. The steps in FIG. 15 may be performed by various software components of the secondary content router 306, such as the secondary content coordinator 610 in FIG. 6 and/or other software components. One, some, or all steps of the method may also or alternatively be performed by one or more other computing devices. One, some, or all of the steps may be rearranged or otherwise modified. Steps may be omitted and/or other steps added.

In order to provide secondary content items for user devices, the secondary content router 306 may be provided with information about the user devices, whether the user devices prefer to receive targeted secondary content items, and/or other data. In step 1501, the secondary content router 306 may receive such information from various sources. For example, the secondary content router 306 may receive the information from user data servers (e.g., the user data server 107, the user data server 318).

Figure 16:
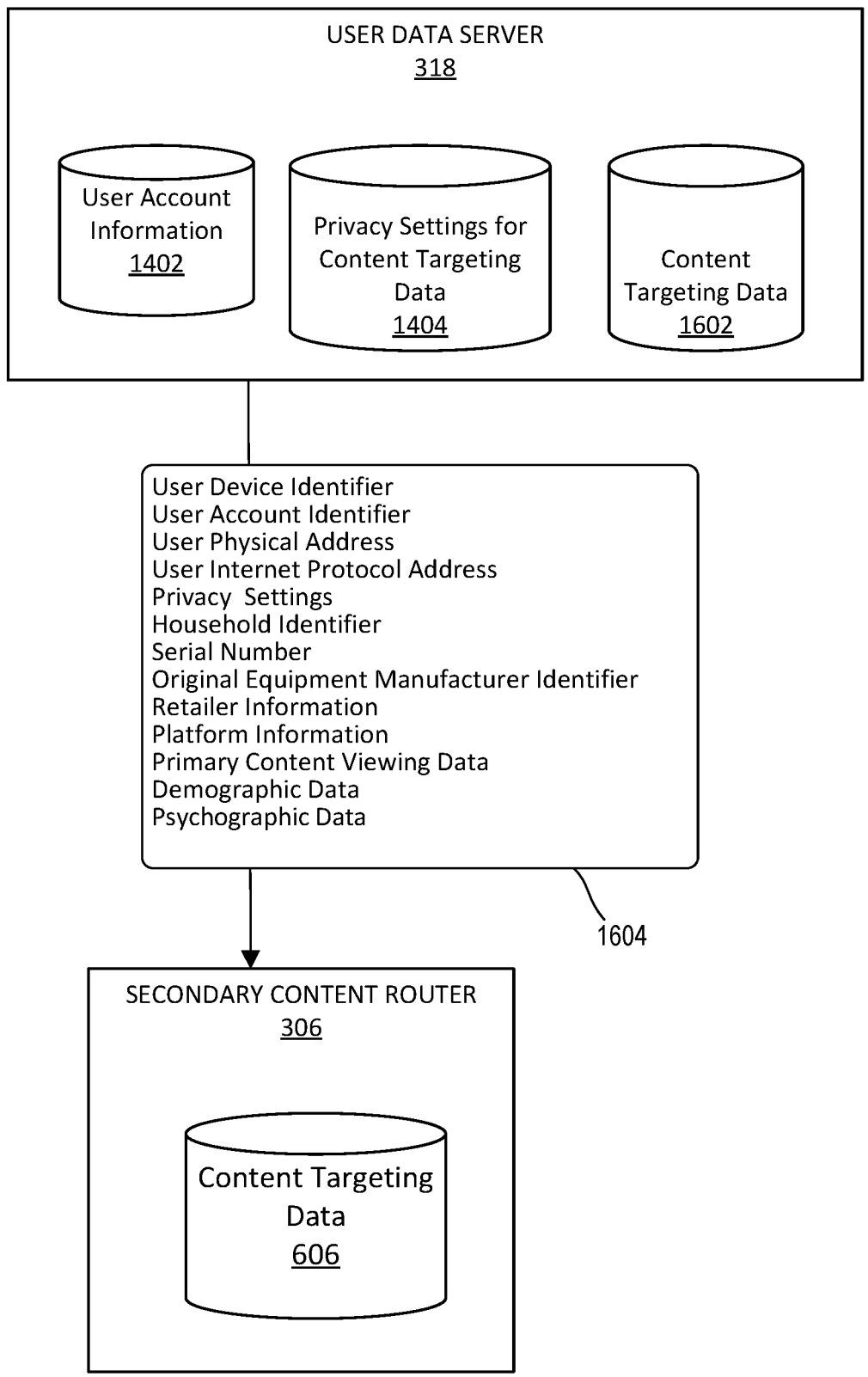
FIG. 16 is a diagram showing example communications and/or data flow between a user data server and a secondary content router.

FIG. 16 shows example communications and/or data flow between the user data server 318 and the secondary content router 306. In addition to the database 1402 for storing user account information and the database 1404 for storing the various privacy settings for the content targeting data of the user devices (as shown in FIG. 14), the user data server 318 may comprise an additional database 1602 for storing content targeting data of the user devices. The database 1602 for storing content targeting data of the user devices may comprise content viewing habits, demographic characteristics, and psychographic characteristics associated with the users of the user devices. The data stored in the database 1602 may be sent by the user devices and/or collected by the user data server 318. Information 1604 about the various user devices may be sent once or periodically (e.g., once a day, once a week, once a month) from the user data server 318 to the secondary content router 306. Information 1604 may comprise unique account identifiers of the user accounts in the network service provider, user device identifiers of the user devices using the user accounts, physical address of the users (e.g., house number, street number, city, state, ZIP code, etc.), IP addresses of the user devices, MAC addresses of the user devices, any household identifier associated with the user devices, privacy settings that indicate whether the user devices prefer or have permitted receiving targeted secondary content items, what content targeting data may be shared with secondary content delivery networks, OEM identifiers of the user devices, serial numbers of the user devices, platforms installed on the user devices, content viewing habits or patterns of the users of the user devices, demographic characteristics of the users of the user devices, psychographic characteristics of the users of the user devices, and/or other data. The secondary content router 306 may store the information 1604 received from the user data server 318 (e.g., the information 1604 may be stored in the database 606 for storing content targeting data).

Figure 17:
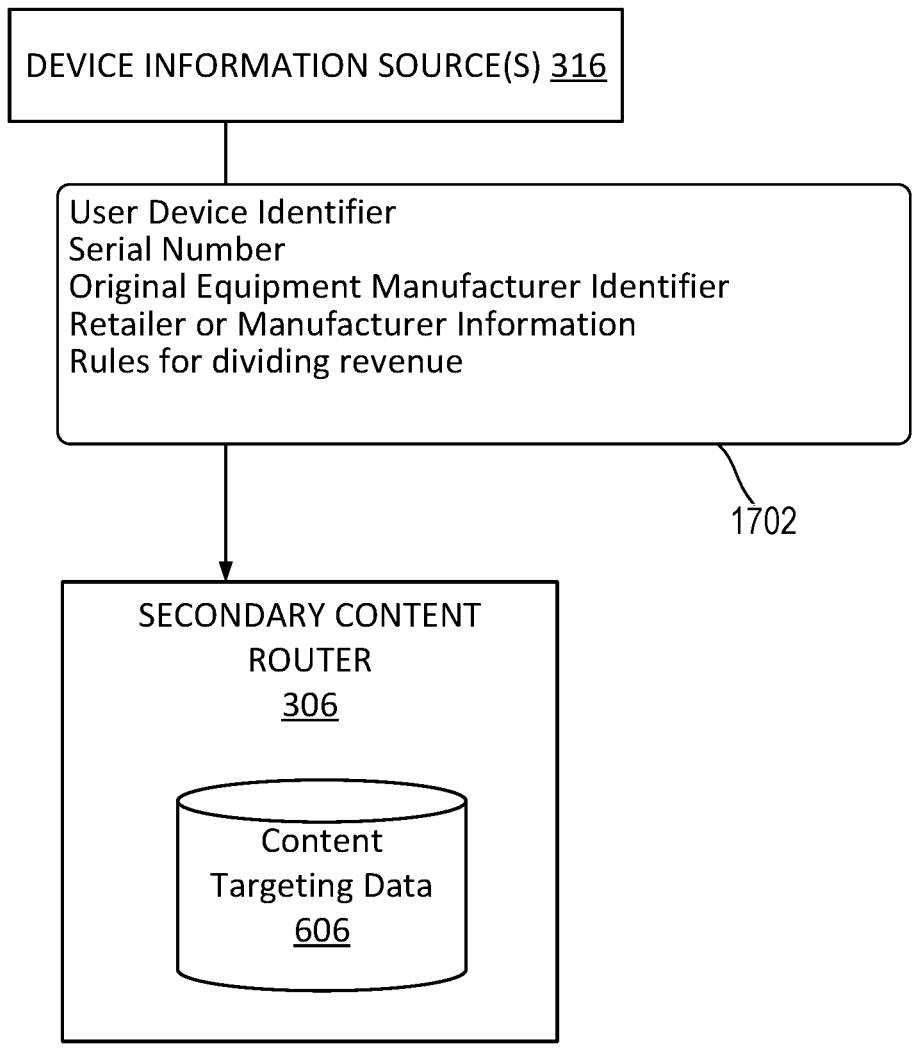
FIG. 17 is a diagram showing example communications and/or data flow between device information sources and a secondary content router.

Referring back to FIG. 15, at step 1501, the secondary content router 306 may receive additional information about the user devices from manufacturers and/or retailers of the user devices. For example, the secondary content router 306 may receive the information from various device information sources (e.g., the device information sources 133, the device information sources 316). The device information sources may be servers associated with retailers and/or manufacturers of the user devices. FIG. 17 shows example information 1702 sent by the device information sources 316 to the secondary content router 306. The information 1702 may comprise any unique user device identifiers of user devices sold by retailers and/or manufactured by the manufacturer, information about the retailer and/or the manufacturer, OEM identifiers of the user devices, serial numbers of the user devices, a rule for dividing revenues earned from outputting secondary content items at the user devices and/or other data. The rules for dividing revenue received for outputting secondary content items in various user devices may be based on information and/or inputs from manufacturers and/or retailers of the user devices and/or primary content delivery networks associated with various applications that can be installed in the user devices. For example, a rule for dividing the revenue may indicate that a portion of the revenue (e.g., X % of the revenue) will be assigned to an entity associated with the local office (e.g., the local office 103), a portion of the revenue (e.g., Y % of the revenue) may be assigned to the entities associated with the application outputting the secondary content items, a portion of the revenue (e.g., Z % of the revenue) may be assigned to the manufacturer of the user device, and the rest of the revenue (e.g., 100-X-Y-Z % of the revenue) may be assigned to the retailer of the user device. The secondary content router 306 may store the information 1702 received from the device information sources 316 (e.g., the information 1702 may be stored in the database 606 for storing content targeting data).

Referring back to FIG. 15, at step 1502, the secondary content router 306 may receive a token from a user device (e.g., the user device 308) along with a request for secondary content items. The secondary content router 306 may receive additional data from the user device (e.g., the data 1205 in FIG. 12). For example, the secondary content router 306 may receive an identifier for the user device, an identifier of the application requesting the secondary content items, an identifier or address for a secondary content delivery network where the request may be forwarded, content viewing habits or patterns of the users of the user devices, demographic characteristics of the users of the user devices, psychographic characteristics of the users of the user devices, and/or other data.

At step 1503, the secondary content router 306 may request the user data server 318 or the user device 308 to provide content targeting data for the user device 308, such as content viewing habits, demographic characteristics, and psychographic characteristics associated with the users of the user devices, user device identifiers of the user devices, physical address of the users (e.g., house number, street number, city, state, ZIP code, etc.), IP addresses of the user devices, MAC addresses of the user devices, any household identifier associated with the user devices, OEM identifiers of the user devices, serial numbers of the user devices, platforms installed on the user devices, content viewing habits or patterns of the users of the user devices, and/or other data. At step 1504, the secondary content router 306 may receive content targeting data associated with the user device 308 and privacy settings associated with the content targeting data. The secondary content router 306 may receive the content targeting data associated with the user device 308 and privacy settings associated with the content targeting data from the user device 308 and/or the user data server 318. Alternatively, the secondary content router may receive the content targeting data associated with the user device 308 and privacy settings associated with the content targeting data as part of the information received at step 1501. The privacy settings for the content targeting data may indicate whether the user device 308 has permission to receive targeted secondary content items (e.g., setting chosen by the various options in user interface 802 in FIG. 8A) and/or whether a user of the user device 308 prefers to receive targeted secondary content items. Additionally, if the user device 308 has permission to receive the targeted secondary content items, the privacy settings may indicate which content targeting data may be shared with the secondary content delivery networks when requesting the secondary content items (e.g., settings chosen by the various options in user interface 804 in FIG. 8B). For example, a user of the user device 308 may indicate to share user content viewing habits and/or patterns of the users of the user device but not demographic data of the users, psychographic data of the users, or zip code of the users.

At step 1505, if the user device 308 has permission to receive targeted secondary content items, the secondary content router 306 may determine which portions of the content targeting data received at step 1504 may be used for receiving the targeted secondary content items based on the privacy settings associated with the content targeting data received at step 1504. Furthermore, the data received at step 1502 may indicate whether the user device has permission to receive targeted secondary content items. If the privacy settings received at step 1504 indicate that a user of the user device 308 prefers only sharing the content viewing habits and/or patterns and not the demographic and psychographic data of the users, only the content viewing habits and/or patterns may be forwarded to the secondary content delivery networks for receiving targeted content items. If the privacy settings received at step 1504 or the data received at step 1502 indicate that a user of the user device does not prefer to receive targeted secondary content items, none of the content targeting data may be forwarded to secondary content delivery.

At step 1506, if the privacy settings received at step 1504 or the data received at step 1502 indicate that a user of the user device 308 does not prefer to receive targeted secondary content items, the secondary content router 306 may determine general data that can be forwarded to the secondary content delivery networks. The general data may comprise a Designated Market Area (DMA) or a Metropolitan Statistical Area (MSA) that identifies the area the user device or the user of the user device may be located. The secondary content router 306 may determine the general data based on the content targeting data. For example, the secondary content router 306 may determine the DMA or MSA based on a ZIP code associated with the user device 308.

At step 1507, the secondary content router 306 may select a secondary content delivery network to which the token and the request for secondary content items received at step 1502 should be forwarded. The additional data received at step 1502 may indicate an identifier or address for a secondary content delivery network where the token and/or the request may be forwarded. Additionally, or alternatively, the secondary content router 306 may select one of the multiple secondary delivery networks in the database 608 by performing a probabilistic determination of which one of the multiple delivery networks may be selected.

At step 1508, the secondary content router 306 may forward the token and/or the request for secondary content items received at step 1502 to the selected secondary content delivery network selected in step 1507. If the token or the user device 308 has indicated that the user device 308 may receive targeted secondary content items, the content targeting data determined at step 1505 may be forwarded to the selected secondary content delivery network of step 1507. Additionally, or alternatively, the general data determined at step 1506 may be forwarded to the selected secondary content delivery network of step 1507. Other information may also be sent to the selected secondary content delivery network of step 1507, such as the number of secondary content items needed, the total length of secondary content items required (e.g., 30 seconds, 1 minute, 1.5 minutes, etc.), and/or other data.

At step 1509, the secondary content router 306 may receive one or more secondary content items from the selected secondary content delivery network of step 1507. At step 1510, the secondary content router 306 may forward the received secondary content items to the user device 308 that sent the token and/or the request for the secondary content items at step 1502.

At step 1511, after sending the secondary content items to the user device 308 and based on the data received at step 1501 or 1502 indicating the recipients of the revenues earned by outputting the secondary content items, the secondary content router may send messages to different recipients (e.g., the local office 103, entities providing and/or associated with the application, manufacturer, and/or retailer) that would receive portions of the revenue. After step 1511, step 1501 may be performed.

Figure 18:
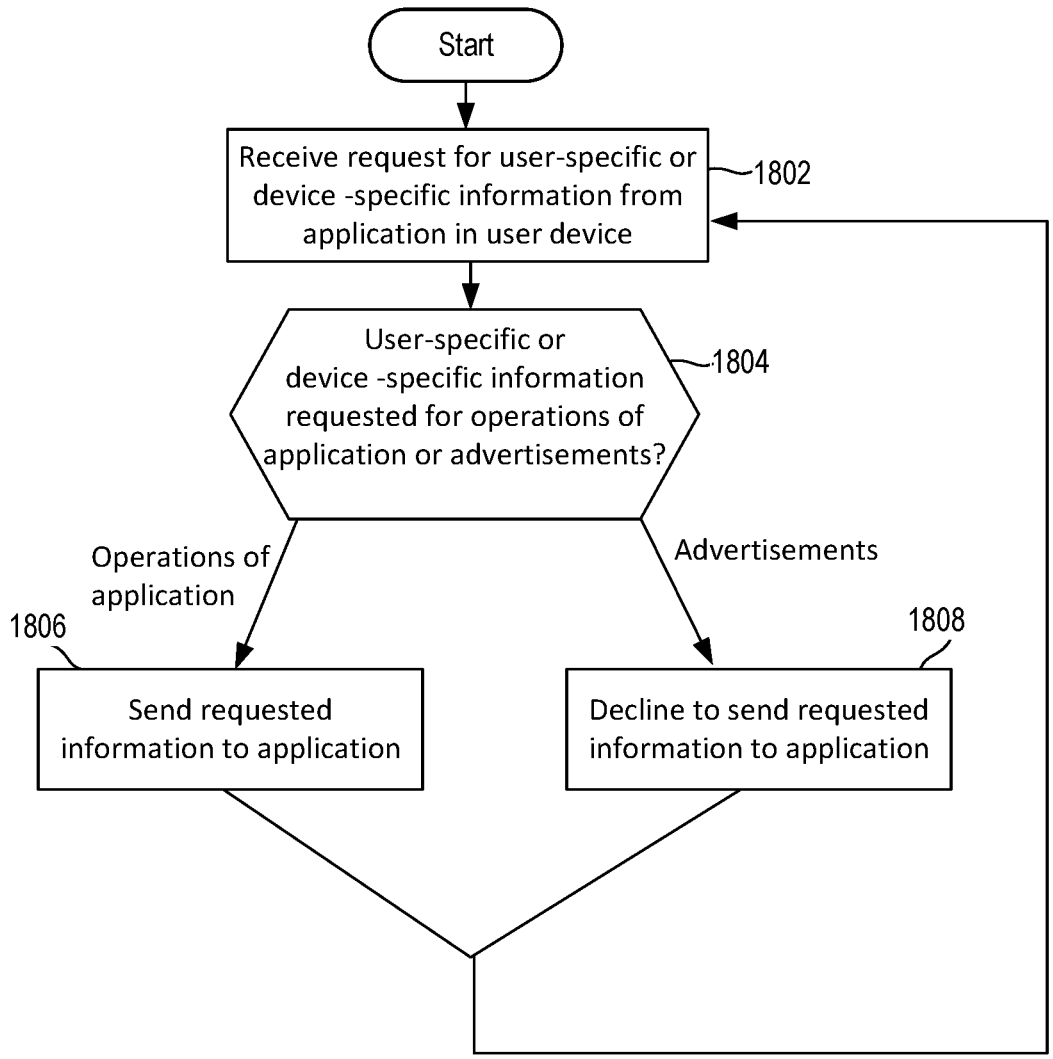
FIG. 18 shows a flow chart showing steps of an example method for a user device receiving requests for user-specific or device-specific information.

FIG. 18 shows a flow chart showing steps of an example method for a user device receiving requests for user-specific or device-specific information from an application installed on the user device. For convenience, FIG. 18 is described by example of performance of the method by the user device 308. However, the method of FIG. 18 may also or alternatively be performed by another user device (e.g., any of the user devices in the premises 102a, the mobile devices 135). One, some, or all of the steps may be rearranged or otherwise modified. Steps may be omitted and/or other steps added.

In step 1802, an application in the user device 308 (e.g., applications 404, 406, 408, 410, 412) may request user-specific or device-specific information. The user-specific information may comprise information for a user account associated with the user device, a unique user account identifier identifying the user account, personal information, username, password, email address, home address, zip code, credit card information, banking information, a household identifier associated with the user account, content viewing data, demographic data, and/or psychographic data of various users of the user device 308. The device-specific data may include a unique device identifier of the user device 308, Internet Protocol address of the user device 308, serial number of the user device 308, Original Equipment Manufacturer (OEM) identifier of the user device 308, and/or identifier of the retailer of the user device 308. Step 1802 may, for example, be performed by the user device 308 when an application in the user device (e.g., applications 404, 406, 408, 410, 412) requests content targeting data as a part of the request received in step 707 of FIG. 7A.

After receiving the request for the user-specific or device-specific information from the application, the user device 308 may determine, at step 1804, whether the requested user-specific or device-specific information will be used to select and/or request advertisements or whether the requested user-specific or device-specific information will be used for the operation of the application. For example, operations of the application may comprise starting execution of the application, displaying available video or audio programs available for outputting by the application, and/or displaying available channels (e.g., television or radio) for streaming. For example, an application may require a user account associated with the application and/or the network service provider of the user device 308 or an email account associated with the user account for the application, an identifier for a user, an identifier for the user device 308, and/or other data to determine a list of available video or audio programs. Additionally, an application may require a zip code for where the user device 308 is located or the IP address of the user device 308 so that information about local services (e.g., local radio stations, local television stations, etc.) may be displayed. Step 1804 may be performed by the user device 308 as a part of determing, at step 708 of FIG. 7A, whether content targeting data (e.g., user-specific or device-specific information) requested at step 707 of FIG. 7A will be used to select or output primary content items (e.g., video and/or audio programs) or secondary content items (e.g., advertisements).

If the user device 308 determines that the application has requested the user-specific or device-specific information for the operation of the application, at step 1806, the user device 308 may send the requested user-specific or device-specific information to the application. Step 1806 may be performed by the user device 308 as a part of sending content targeting data (e.g., user-specific or device-specific information) at step 709 of FIG. 7A. If the user device 308 determines at step 1804 that the application requested the user-specific or device-specific information for advertisements, step 1808 may be performed. At step 1808, the user device may decline to send or provide the requested user-specific or device-specific information to the application. The user device 308 may send a message to the application indicating that the request has been declined. Step 1808 may be performed by the user device 308 as a part of declining to send content targeting data (e.g., user-specific or device-specific information) at step 711 of FIG. 7A.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a user device configured to output primary content and secondary content, privacy preferences associated with sharing of content targeting data, wherein the content targeting data comprises one or more of:
user-specific information associated with the user device; or
device-specific information associated with the user device;
receiving a first request for at least a portion of the content targeting data;
based on a determination that the first request corresponds to use of the content targeting data to output primary content:
sending the at least the portion of the content targeting data; and
generating, based on an application used to output the primary content and the secondary content, a token configured to identify the user device;
receiving a second request for the at least the portion of the content targeting data; and
based on a determination that the second request corresponds to use of the content targeting data to output the secondary content and based on the privacy preferences:
preventing sending of the at least the portion of the content targeting data; and
sending, in response to the second request for the at least the portion of the content targeting data, the token configured to identify the user device.

2. The method of claim 1, wherein the secondary content comprises one or more advertisements.

3. The method of claim 1, wherein:
the receiving the first request comprises receiving, by a data manager of the user device, the first request from the application; and
the receiving the second request comprises receiving, by the data manager of the user device, the second request from the application.

4. The method of claim 1, wherein:
the sending the at least the portion of the content targeting data comprises permitting the application to access the at least the portion of the content targeting data; and
the preventing sending of the at least the portion of the content targeting data comprises preventing the application from accessing the at least the portion of the content targeting data.

5. The method of claim 1, wherein:
the sending the at least the portion of the content targeting data comprises permitting a first application, installed on the user device, to access the at least the portion of the content targeting data; and
the preventing sending of the at least the portion of the content targeting data comprises preventing a second application, installed on the user device, from accessing the at least the portion of the content targeting data.

6. The method of claim 1, wherein the determination that the first request corresponds to use of the content targeting data to output primary content comprises one or more of:
a determination that the first request is associated with requesting, from one or more primary content delivery networks, lists indicating services available to send primary content; or
a determination that the first request is associated with requesting, from one or more primary content delivery networks, lists indicating available primary content.

7. The method of claim 1, wherein the determination that the second request corresponds to use of the content targeting data to output the secondary content comprises a determination that the second request was received from an application installed on the user device during an output of primary content by the application.

8. The method of claim 1, wherein the content targeting data comprises the user-specific information, and wherein the user-specific information comprises one or more of:
a user account associated with the user device;
personal information associated with a user of the user device;
an indication of a physical location of the user device;
a household identifier associated with the user device;
content viewing data associated with the user device;
demographic characteristics associated with the user device; or
psychographic characteristics associated with the user device.

9. The method of claim 1, wherein the content targeting data comprises the device-specific information, and wherein the device-specific information comprises one or more of:
an identifier of the user device;
an Internet Protocol (IP) address of the user device;
a media access control (MAC) address of the user device;
an Original Equipment Manufacturer (OEM) identifier of the user device; or
an identifier of a retailer of the user device.

10. The method of claim 1, further comprising:
sending, based on the determination that the second request corresponds to use of the content targeting data to output the secondary content and based on the privacy preferences, one or more of:
an indication that the at least the portion of the content targeting data will not be provided; or
a different portion of the content targeting data.

11. A method comprising:
receiving, by a user device configured to output primary content and secondary content, privacy preferences associated with sharing of content targeting data, wherein the content targeting data comprises one or more of:
user-specific information associated with the user device; or
device-specific information associated with the user device;
receiving a first request for at least a portion of the content targeting data;
based on a determination that the first request corresponds to use of the content targeting data to output primary content:
sending the at least the portion of the content targeting data; and
generating, based on an application used to output the primary content and the secondary content, a token configured to identify the user device;
receiving a second request for the at least the portion of the content targeting data; and
based on a determination that the second request corresponds to use of the content targeting data to output the secondary content and based on the privacy preferences,
sending, in response to the second request for the at least the portion of the content targeting data:
an indication that the at least the portion of the content targeting data will not be provided; and
the token configured to identify the user device.

12. The method of claim 11, wherein:
the sending the at least the portion of the content targeting data comprises permitting the application to access the at least the portion of the content targeting data; and
the sending the indication that the at least the portion of the content targeting data will not be provided comprises preventing the application from accessing the at least the portion of the content targeting data.

13. The method of claim 11, wherein the determination that the first request corresponds to use of the content targeting data to output primary content comprises one or more of:
a determination that the first request is associated with requesting, from one or more primary content delivery networks, lists indicating services available to send primary content to the user device; or
a determination that the first request is associated with requesting, from one or more primary content delivery networks, lists indicating available primary content, and
wherein the determination that the second request corresponds to use of the content targeting data to output the secondary content comprises a determination that the second request is associated with use of the content targeting data to output one or more advertisements.

14. The method of claim 11, wherein the determination that the second request corresponds to use of the content targeting data to output the secondary content comprises a determination that the second request was received from the application.

15. The method of claim 11, wherein the content targeting data comprises the user-specific information, and wherein the user-specific information comprises one or more of:
a user account associated with the user device;
personal information associated with a user of the user device;
an indication of a physical location of the user device;
a household identifier associated with the user device;
content viewing data associated with the user device;
demographic characteristics associated with the user device; or
psychographic characteristics associated with the user device, and
wherein the content targeting data comprises the device-specific information, and wherein the device-specific information comprises one or more of:
an identifier of the user device;
an Internet Protocol (IP) address of the user device;
a media access control (MAC) address of the user device;
an Original Equipment Manufacturer (OEM) identifier of the user device; or
an identifier of a retailer of the user device.

16. The method of claim 11, wherein the at least the portion of the content targeting data comprises a zip code associated with the user device.

17. A method comprising:
receiving, by a user device from an application installed on the user device, a first request for at least a portion of content targeting data, wherein the content targeting data comprises one or more of:
user-specific information associated with the user device; or
device-specific information associated with the user device;
based on a determination that the first request corresponds to use of the content targeting data to perform an operation of the application:
allowing the application to access the at least the portion of the content targeting data; and
generating, based on the application, a token configured to identify the user device;
receiving, from the application, a second request for the at least the portion of the content targeting data; and
based on a determination that the second request corresponds to use of the content targeting data to output one or more advertisements for the application:
preventing the application from accessing the at least the portion of the content targeting data; and
sending, in response to the second request for the at least the portion of the content targeting data the token configured to identify the user device.

18. The method of claim 17, wherein the determination that the first request corresponds to use of the content targeting data to perform the operation of the application comprises one or more of:
a determination that the first request is associated with requesting, by the application and from one or more primary content delivery networks, lists indicating services available to send primary content to the user device; or
a determination that the first request is associated with requesting, by the application and from the one or more primary content delivery networks, lists indicating available primary content.

19. The method of claim 17, wherein the determination that the second request corresponds to use of the content targeting data to output the one or more advertisements comprises a determination that the second request was received from the application during an output of primary content by the application.

20. The method of claim 17, wherein the preventing the application from accessing the at least the portion of the content targeting data further comprises sending, to the application, one or more of:
an indication that the at least the portion of the content targeting data will not be provided; or
a different portion of the content targeting data.

21. A method comprising:
receiving, by a user device from an application installed on the user device, a first request for at least a portion of content targeting data, wherein the content targeting data comprises one or more of:
user-specific information associated with the user device; or
device-specific information associated with the user device;
based on a determination that the first request corresponds to use of the content targeting data to perform an operation of the application:
allowing the application to access the at least the portion of the content targeting data; and
generating, based on the application, a token configured to identify the user device;
receiving, from the application, a second request for the at least the portion of the content targeting data; and
based on a determination that the second request corresponds to use of the content targeting data to output one or more advertisements, sending, in response to the second request:
an indication that the at least the portion of the content targeting data will not be provided; and
the token configured to identify the user device.

22. The method of claim 21, wherein the determination that the first request corresponds to use of the content targeting data to perform the operation of the application comprises one or more of:
a determination that the first request is associated with initiating the application;
a determination that the first request is associated with requesting, by the application and from one or more primary content delivery networks, lists indicating services available to send primary content to the user device; or
a determination that the first request is associated with requesting, by the application and from the one or more primary content delivery networks, lists indicating available primary content.

23. The method of claim 21, wherein the at least the portion of the content targeting data comprises a zip code associated with the user device.

* * * * *